(12) United States Patent
Kang et al.

(10) Patent No.: US 9,618,203 B2
(45) Date of Patent: Apr. 11, 2017

(54) METHOD AND SYSTEM FOR HEAT RECOVERY FROM PRODUCTS OF COMBUSTION AND CHARGE HEATING INSTALLATION INCLUDING THE SAME

(71) Applicants: L'Air Liquide, Société Anonyme pour l'Étude et l'Exploitation des Procédés Georges Claude, Paris (FR); American Air Liquide, Inc., Fremont, CA (US)

(72) Inventors: Taekyu Kang, Newark, DE (US); James J. F. McAndrew, Chadds Ford, PA (US); Youssef Joumani, Houston, TX (US); Remi Pierre Tsiava, Houston, TX (US)

(73) Assignees: L'Air Liquide Société Anonyme Pour L'Étude Et L'Eploitation Des Procedes Georges Claude, Paris (FR); American Air Liquide, Inc., Fremont, CA (US)

( * ) Notice: Subject to any disclaimer, the term of this patent is extended or adjusted under 35 U.S.C. 154(b) by 603 days.

(21) Appl. No.: 13/955,909

(22) Filed: Jul. 31, 2013

(65) Prior Publication Data
US 2014/0087316 A1   Mar. 27, 2014

Related U.S. Application Data

(60) Provisional application No. 61/706,094, filed on Sep. 26, 2012.

(51) Int. Cl.
*F23D 11/44* (2006.01)
*F23L 15/04* (2006.01)
(Continued)

(52) U.S. Cl.
CPC ............. *F23L 15/04* (2013.01); *F23D 14/66* (2013.01); *F23L 7/007* (2013.01); *F23L 15/00* (2013.01); *F23L 15/02* (2013.01); *F27D 17/004* (2013.01)

(58) Field of Classification Search
CPC ............................... F23L 15/04; F23L 15/045
(Continued)

(56) References Cited

U.S. PATENT DOCUMENTS 3,168,136 A * 2/1965 Ammon .................... F28D 7/06
165/157
3,288,199 A * 11/1966 Gerrard .................... F23N 1/02
236/15 E (Continued)

FOREIGN PATENT DOCUMENTS

EP          1014026 A2    6/2000
EP          1801497 A2    6/2007
WO    WO2008/141937      11/2008

OTHER PUBLICATIONS

International Search Report and Written Opinion for PCT/US2013/061974 dated Mar. 13, 2014.
(Continued)

*Primary Examiner* — Avinash Savani
*Assistant Examiner* — Vivek Shirsat
(74) *Attorney, Agent, or Firm* — Christopher J. Cronin

(57) ABSTRACT

A plurality of independently flow rate-controlled flows of fuel may be preheated at a heat exchanger (or both oxidant and fuel at separate heat exchangers) by heat exchange with a hot shell-side (heat transfer) fluid. The separate flows of hot fuel are directed to associated separate burners where they combust with flows of fuel to produce hot combustion gases. The hot combustion gases are used to preheat the hot shell-side fluid at a recuperator or regenerator.

13 Claims, 15 Drawing Sheets

(51) Int. Cl.
  *F23L 7/00* (2006.01)
  *F23D 14/66* (2006.01)
  *F27D 17/00* (2006.01)
  *F23L 15/00* (2006.01)
  *F23L 15/02* (2006.01)

(58) Field of Classification Search
  USPC .......... 431/11, 161, 162, 215, 216, 278; 432/482
  See application file for complete search history.

(56) References Cited

U.S. PATENT DOCUMENTS

| | | | |
|---|---|---|---|
| 5,006,141 | A | 4/1991 | Chen et al. |
| 5,057,133 | A | 10/1991 | Chen et al. |
| 5,295,817 | A * | 3/1994 | Young .......... E21B 41/0071 431/11 |
| 5,714,132 | A | 2/1998 | Kapoor et al. |
| 5,807,418 | A | 9/1998 | Chamberland et al. |
| 6,250,916 | B1 | 6/2001 | Philippe et al. |
| 6,910,879 | B2 | 6/2005 | Dugue et al. |
| 7,384,539 | B2 * | 6/2008 | Witte .......... B01J 19/0013 165/172 |
| 2006/0266501 | A1 | 11/2006 | So et al. |
| 2007/0172781 | A1 | 7/2007 | Tsiava et al. |
| 2007/0281254 | A1 | 12/2007 | Leroux et al. |
| 2007/0287107 | A1 | 12/2007 | Tsiava et al. |
| 2009/0084140 | A1 | 4/2009 | Kobayashi |
| 2009/0298002 | A1 | 12/2009 | Constantin et al. |
| 2010/0258263 | A1 | 10/2010 | Douxchamps et al. |
| 2010/0291493 | A1 * | 11/2010 | Jarry .......... C03B 5/2353 431/12 |
| 2011/0104625 | A1 | 5/2011 | Amirat et al. |

OTHER PUBLICATIONS

International Search Report and Written Opinion for PCT/US2013/061986 dated Mar. 13, 2014.
The Edmeston Heat Recovery System, Carbon Black—Glass—Steel, printed from website: http://www.edmeston.com/downloads/heat_recovery/Heat_Recovery_Eng_060829.pdf, Oct. 20, 2011.
Kalfrisa Energia Y Medio Ambiente, printed from website: http://www.kalfrisa.com/default.aspx?info=000189, printed Sep. 30, 2013.
Illy, et al., "Process for Heat Recovery and Energy Savings in a (Oxy-Fired) Glass Furnace: A Technology Survey"; International Glass Journal, 96, 1998—Need Copy of Reference!
U.S. Department of Energy; "Development of an advanced glass melting system: The Thermally Efficient Alternative Melter, TEAM. Phase 1, Final report"; DE-AC02-89CE40917F; Feb. 1992; NTIS; http://www.ntis.gov/search/product.aspx?abbr=DE93005211—Need Copy of Reference!
"1.4. Construction of Shell and Tube Heat Exchangers"; Wolverine Tube Heat Transfer Data Book; pp. 32-39.
"Pre-Heating Technology"; Hotwork International AG; pp. 27-28.
Walter P. Driedger; "Controlling Shell and Tube Exchangers"; Hydrocarbon Processing; Mar. 1998; pp. 3-1-3-13; May 20, 2000.
"ALGLASS HeatOx—Oxy-Combustion With Heat Recovery Makes Sustainable Performances"; Air Liquide Presentation; Nov. 2010; 12 Pages.

* cited by examiner

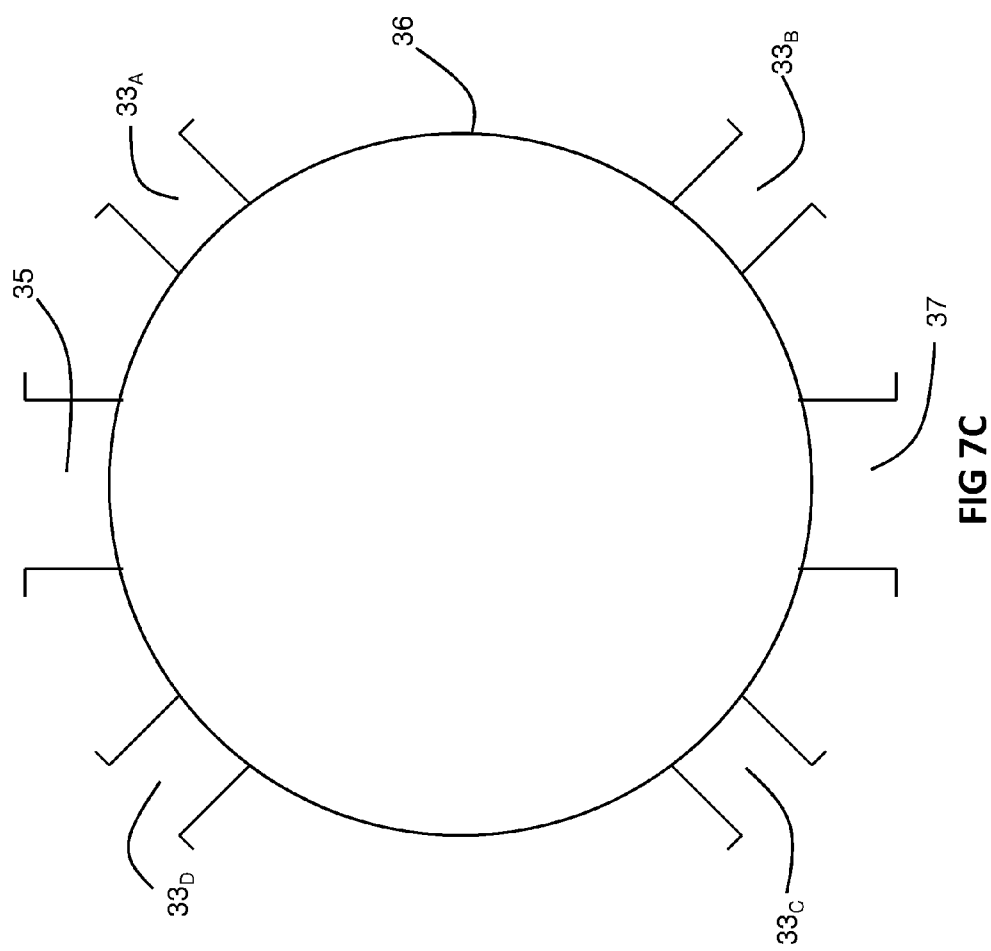

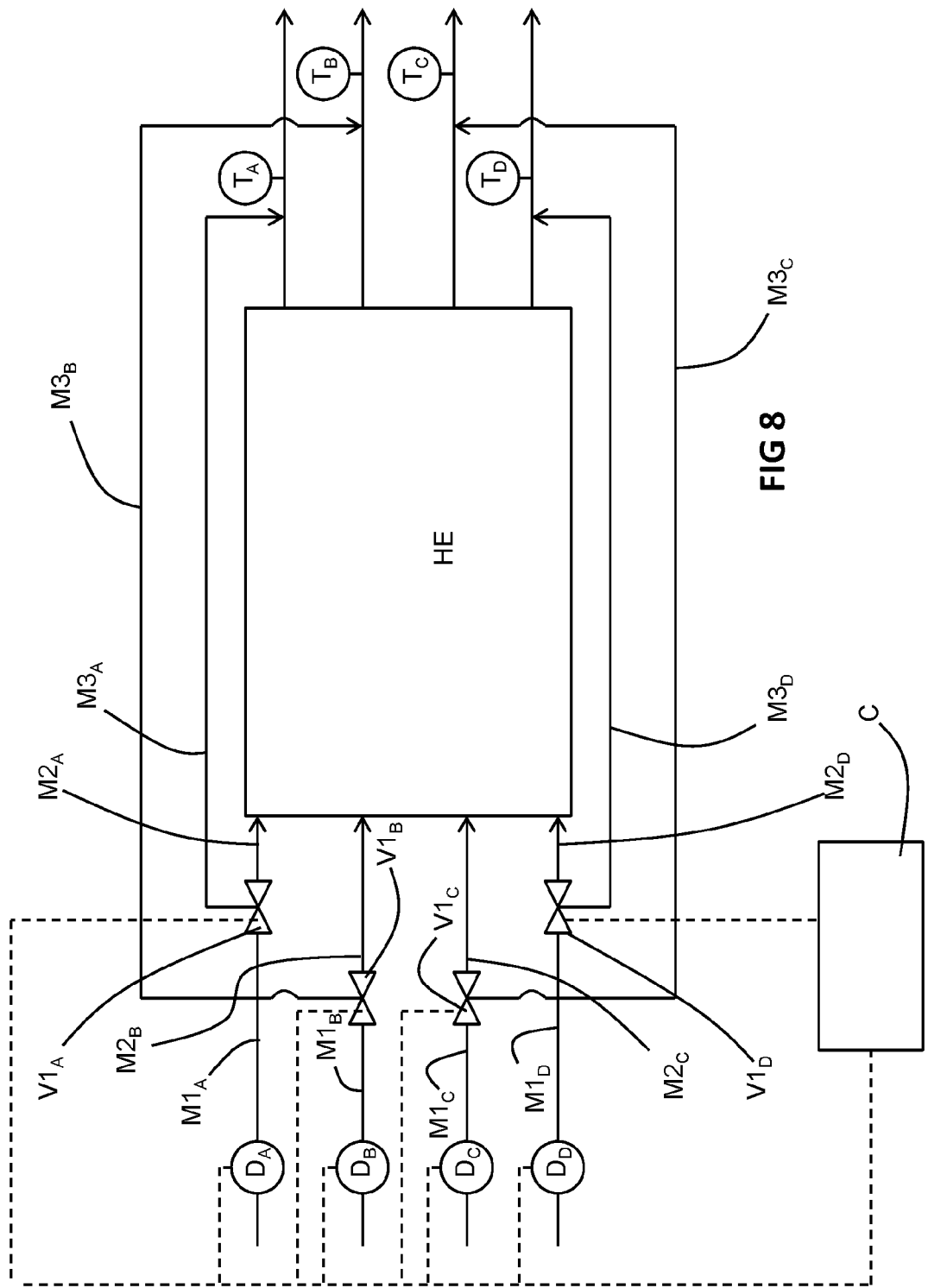

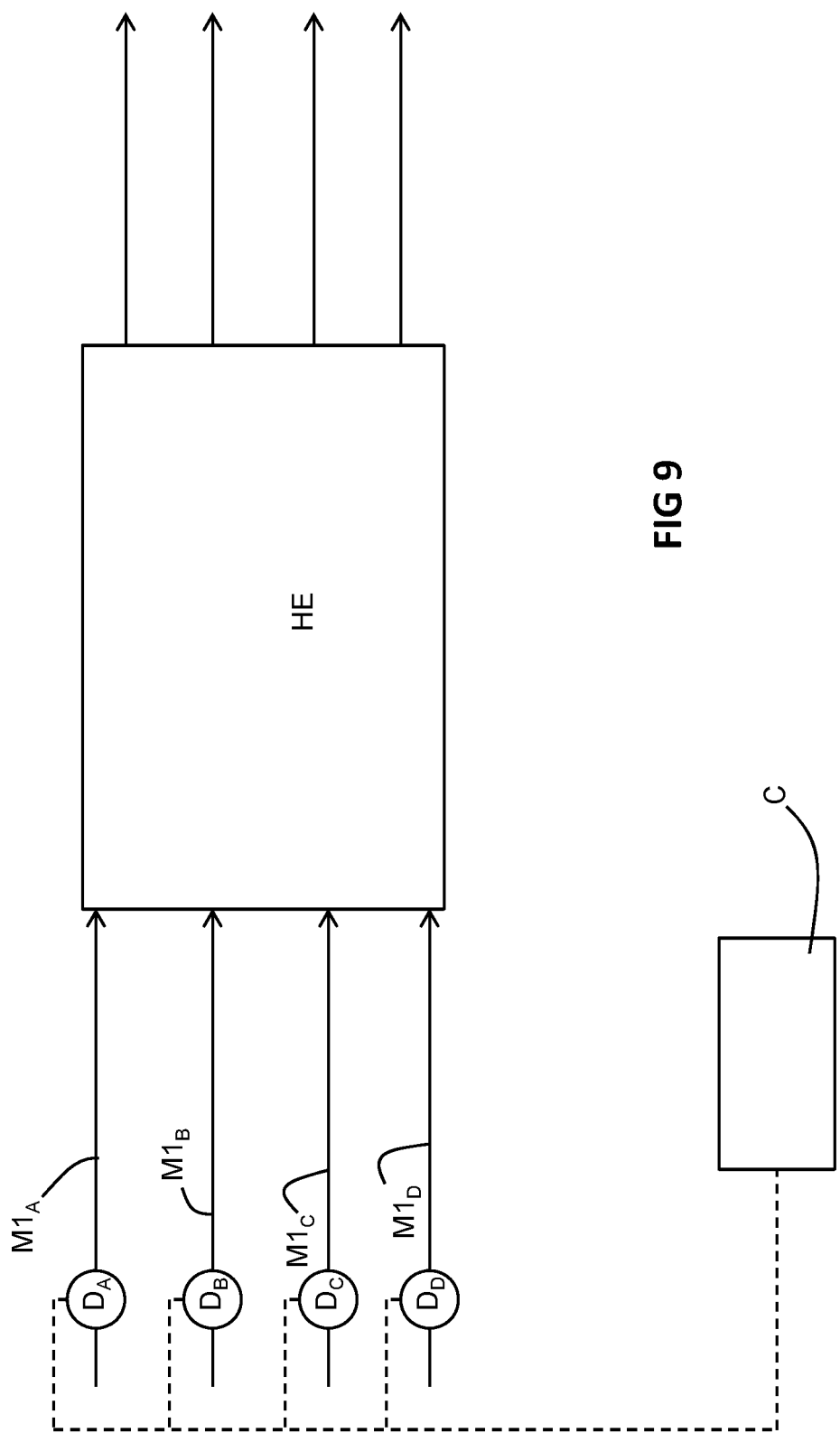

METHOD AND SYSTEM FOR HEAT RECOVERY FROM PRODUCTS OF COMBUSTION AND CHARGE HEATING INSTALLATION INCLUDING THE SAME

CROSS-REFERENCE TO RELATED APPLICATIONS

This patent application claims the benefit of U.S. Provisional Patent Application No. 61/706,094 filed Sep. 26, 2012.

BACKGROUND

In processes which rely on delivery of large amounts of heat energy into a furnace by combustion of a fuel, it is particularly important to achieve as high an energy-efficiency as possible. Thus it is a common practice to recover excess heat in the flue-gas, for example by using it to heat combustion air. Another way to improve efficiency is by oxy-combustion, which, by replacing air ordinarily used in combustion with a stream that is largely oxygen, avoids heating the nitrogen component of air. While heat lost to the flue gas is reduced in oxy-combustion (because the flue-gas volume is less), the amount of heat lost is still substantial, and it would be advantageous to recover that heat.

Heat recovery from oxycombustion in glass-making was discussed in detail in a study titled "Development of an advanced glass melting system: The Thermally Efficient Alternative Melter, TEAM. Phase 1, Final report.—Progress rept." that was funded by the U.S. Department of Energy (DOE) and completed by Air Products under contract DE-AC02-89CE40917F (report number DOE/CE/40917-T2 published in February 1992 and available from the National Technical Information Service of the U.S. government). In this report, the primary methods discussed were: 1) batch and cullet (i.e. glass-making raw materials) pre-heating, 2) natural gas reforming with steam or $CO_2$, and 3) gas turbine cycles (where heat is converted to gas compression for an air separation unit). Of these, the batch and cullet pre-heating options were found to offer the greatest improvement in efficiency. However, feedback from glassmakers indicated that batch and cullet pre-heating approaches had been tried and were found extremely difficult due to clogging, mechanical complexity, and continual maintenance problems. Natural gas reforming with steam was found to offer good efficiency improvement and was recommended for further development.

In the automotive field, heat exchangers are known that allow transfer of heat energy to multiple independent fluid flows. Such a heat exchanger is described by US2006/0266501. These are plate-type heat exchangers, which are not suitable for oxygen service for multiple reasons. For example, this type of heat exchanger does not provide a sufficiently smooth flow path and is too difficult to manufacture with adequate cleanliness for oxygen service, and especially for hot oxygen service. Cleanliness for hot oxygen service is of course greatly important for safety reasons since the local highly oxidizing environment can pose an unacceptably high risk of uncontrolled combustion.

U.S. Pat. No. 5,006,141 discloses cullet pre-heating schemes including ones where both cullet pre-heating and fuel pre-heating are combined. These schemes are subject to the difficulties of cullet pre-heating discussed above.

U.S. Pat. No. 5,057,133 discloses a natural gas reforming scheme whereby flue gas used to provide heat to the reformer is combined with a recycle stream from downstream of the reformer, in order to provide temperature control. Using a fluidized bed of hot sand to capture condensibles and recycling the sand to the glass-making furnace is also described.

U.S. Pat. No. 5,714,132 discloses natural gas reforming using the flue gas itself as a source of steam and/or $CO_2$. While this concept appears attractive in principle, in practice, sulfur and other catalyst poisons in the flue gas are difficult to economically remove.

Although natural gas reforming was considered promising for heat recovery, it has not been implemented. Whereas steam reforming is a well-known process, this application requires additional development, notably reformer tubes compatible with the condensation of sulfates and borates expected in the glass flue-gas stream, and burner technology suited for the lower-energy-density fuel. These hurdles have proved too daunting to allow the practical application of the concept.

Also mentioned in the above DOE report are the concepts of heating both the oxygen and natural gas streams. The temperature limit for $O_2$ pre-heating is given as 465° F. (240° C.), imposed by material compatibility with hot oxygen, while that for natural gas pre-heating is given as 750° F. (399° C.), imposed by the thermal cracking (carbon formation) of natural gas at higher temperatures.

An alternative to the schemes discussed above is the heating of oxygen to temperatures above 240° C. However, heating the oxygen stream is extremely challenging, because the high reactivity of oxygen, especially at high temperature, places extreme constraints on the design and construction of the heat recovery system. For example, while it is a common practice to use a regenerator, through which flue gas and air flow in alternating cycles in order to preheat the air, it is generally considered impossible to use this technique with oxygen because of the fear that oxygen would react with contaminants inevitably present in the flue gas and deposited in the regenerator.

Another known solution is the use of ceramic heat exchangers. These systems are usually intended to operate at temperatures of about 1000° C., where heat transfer is radiative. However, ceramic materials are known to be fragile and ceramic heat exchangers are prone to leakage. Whereas minor leakage of air into the flue gas stream is acceptable, this is not the case for oxygen or fuel gas streams due to safety issues. Thus, heat exchangers of this type are not acceptable for heating oxygen or fuel gas streams.

Thus, there is a need to provide a method and system for the recovery of heat from products of combustion that is robust and not susceptible to leaks causing safety issues.

US 2009/0298002 discloses the use of a shell and tube heat exchanger where oxygen flows through the double-walled tubes while hot combustion gases flow through the shell. Contact between the hot combustion gases, which may include unburnt fuel, and the oxygen is inhibited not only by the presence of the walls of the inner tubes but also by the presence of the walls of the outer tubes. The annular spaces between the ducts and tubes contain a static inert gas so that heat exchange first proceeds between the hot combustion gases and the inert gas and then between the inert gas and the oxygen. US 2009/0298002 does not address how the novel heat exchanger may be used in a furnace having multiple burners. Moreover, it suffers from the disadvantage of exhibiting a relatively lower heat exchange coefficient because each of the two separate phases of heat exchange take place between a flowing fluid and a static fluid.

Thus, there is a need to provide a method and system for the recovery of heat from products of combustion that includes multiple burners and which has a sufficiently high heat exchange coefficient.

U.S. Pat. No. 5,807,418 discloses heat recovery by "co-current indirect heat exchange" of an oxidant (at least 50% $O_2$) by the flue-gas, followed by using the partially-cooled flue-gas to pre-heat batch and/or cullet. As used by U.S. Pat. No. 5,807,418, "co-current indirect heat exchange" refers simply to a heat exchanger in which the oxidant and heat exchanger are separated by a wall, with both the oxidant and the flue gas flowing in the same direction. While a sketch is provided, details such as materials of construction of the heat exchanger are not, but for the comment that the heat exchanger is "constructed using materials and in a way that renders it compatible with and safe for handling oxygen-rich oxidants and high temperatures". Considering the practical difficulty of constructing such a heat exchanger, this instruction is not sufficient to allow practical implementation by the skilled artisan.

Thus, there is a need to provide a method and system for the recovery of heat from products of combustion that allows practical implementation by one of ordinary skill in the art.

US 2009/0084140 uses a scheme similar to U.S. Pat. No. 5,807,418, but with batch/cullet pre-heat in parallel with oxidant pre-heat, and with additional disclosure related to the batch/cullet heat exchanger. Again, no details on the construction of the oxidant heat exchanger are disclosed. As best shown in FIG. 1, hot combustion gas FG is used to preheat oxygen $O_M$ at a heat exchanger HX. The hot oxygen is split into three streams $O_A$, $O_B$, $O_C$ each one of which is combusted with a fuel stream F at an associated burner B to produce the hot combustion gas FG. This approach suffers from the disadvantage that the flow rates of the individual oxygen streams can only be separately controlled downstream of the oxygen heat exchanger. This means that the flow control devices are subjected to hot oxygen attack, leading to premature and potential catastrophic failure. This approach also suffers from the disadvantage that unburnt fuel in the hot combustion gases may come into contact with oxygen, either from a leak or at a regenerator, thereby posing an unacceptably high risk of catastrophic uncontrolled combustion.

Thus, there is a need to provide a method and system for the recovery of heat from products of combustion that allows separate control of flow rates of hot oxygen to multiple burners from a single heat exchanger that does not exhibit an unacceptably high risk of premature and potential catastrophic failure.

In order to provide a practical method for heating oxygen with flue gas, the concept of using a heat transfer fluid was discussed by Illy et al. (International Glass Journal, 96, pp 65-72, 1998), for the case of a glass-melting furnace. For the sake of clarity, it should be noted that Illy et al. refer to a heat exchanger in which the flue gas and oxidant are separated only by a wall as "direct", whereas Chamberland et al. refer to it as "indirect". Illy et al. discloses a scheme using three heat exchangers: one to transfer heat from flue gas to a heat transfer fluid, a second to transfer from the heated fluid to oxygen, and a third to transfer from the heated fluid air to natural gas fuel. According to their description, the heat transfer fluid might be helium using a closed loop recycling system, but could be any gas such as steam or air, with air being the least expensive option. Illy et al. did not consider how hot oxygen flow would be controlled downstream of the heat exchangers.

One solution commercially implemented utilized, on a per burner basis, includes one heat exchanger for preheating oxygen and one heat exchanger for preheating natural gas. The oxygen and natural gas are preheated in the heat exchanger against a flow of hot air that is itself heated against hot combustion gases in a recuperator. While this approach has produced desirable heat recoveries, the high number of heat exchangers can drive up capital expense to an undesirably high level when the price of metals suitable for oxygen service is itself high. Additionally, in small to medium sized furnaces, the available space may not be adequate for accommodating the large footprint taken up by the high number of heat exchangers.

Thus, there is a need to provide a method and system of heat recovery from products of combustion that does not produce an unacceptably high capital expense or present an unsatisfactorily large footprint.

US 2007/0287107 discloses one solution to the problem of control of oxygen flow when using hot oxygen. Two oxidants are delivered where first is heated to at least 300° C. and the second is maintained at 200° C. or lower. The drawback of this method is that a substantial fraction of the oxygen flow is not significantly heated and thus the recovery of heat from the flue gas is limited.

Thus, there is a need to provide a method and system of heat recovery from products of combustion that achieves a satisfactorily high degree of heat recovery.

Another solution is to use multiple heat exchangers, preferably one heat exchanger per burner, but at least one heat exchanger per 3 burners. This solution is described in US2010/0258263 and WO2008/141937. This approach results in a very high capital expense because of the need to have one heat exchanger for oxygen per 1-3 burners as well as one heat exchanger for fuel per 1-3 burners. Moreover, the large number of heat exchangers as a whole consumes a lot of space, as each heat exchanger is rather large.

Thus, there is a need to provide a method and system of heat recovery from products of combustion that does not require a very high capital expense and does not consume an undesirably high amount of space.

U.S. Pat. No. 6,250,916 discloses one solution where hot combustion gas is used to preheat air which is used, in turn, to preheat oxygen. In one embodiment, and as best illustrated in FIG. 2, each one of several burners B is associated with one heat exchanger $HX_O$ for preheating oxygen $O_C$ and one heat exchanger $HX_F$ for preheating fuel $F_C$. The preheated oxygen $O_H$ and preheated fuel $F_H$ are combusted at the burners B to produce the hot combustion gases FG. Air A is heat exchanged with hot combustion gases FG at a recuperator R and directed in parallel to the heat exchangers $HX_O$, $HX_F$ as multiple streams equal in number to the number of burners. Similar to US2010/0258263 and WO2008/141937, this approach also results in a very high capital expense and consumes a lot of space.

In another embodiment of U.S. Pat. No. 6,250,916, and as best illustrated in FIG. 3, air A is preheated with hot combustion gases FG at a recuperator R and directed through three heat exchangers $HX_O$, in series, for preheating oxygen $O_C$. The preheated oxygen $O_H$ from each heat exchanger $HX_O$ is split into two lines each one of which is directed to one of two burners B in a pair of burners B. The cooler air exiting the last heat exchanger $HX_O$ for preheating oxygen $O_C$ is then directed through three heat exchangers $HX_F$, again in series, for preheating fuel $F_C$. The preheated fuel $F_H$ from each heat exchanger $HX_F$ is split into two lines each one of which is directed to one of two burners B in a pair of burners B. Similar to US 2009/0084140, in order to have separate control of the flow rate of oxygen for each burner in a pair of burners, flow control devices must be located downstream of the heat exchangers, thereby subjecting them to hot oxygen attach and raising the potential for premature and potential catastrophic failure. While the oxygen flow rate for each burner in a pair of burners may be fixed, and thereby significantly decrease the ability to control heat flux within the furnace, the ratio of heat exchangers to burners is still as high as 1:2. Thus, this approach does not achieve a sufficiently desirable reduction in capital cost and space requirements.

Thus, there is a need to provide a method and system of heat recovery from products of combustion that allows a greater degree of control over the individual flow rates of burner oxygen without an unacceptably high risk of premature and potentially catastrophic failure of the flow rate control devices and without incurring an unacceptably high capital expense.

SUMMARY

There is provided a system for recovering heat from a furnace, comprising: a source of fuel; a recuperator or regenerator; n burners, n being an integer greater than or equal to two, each of said burners comprising a fuel nozzle and an oxidant nozzle; a heat exchanger comprising a housing having opposite feed and discharge ends, a hot fluid inlet and a cold fluid outlet fluidly communicating with an interior of said housing, and a plurality of fuel tubes, the feed inlet having n cold fuel inlets, the discharge end having n hot fuel outlets, the plurality of fuel tubes comprising n sets of fuel tubes each set of which fluidly communicates between an associated one of said n cold fuel inlets and an associated one of said n hot fuel outlets; a hot heat exchange fluid conduit having a first end connected to and receiving a hot heat exchange fluid from said recuperator or regenerator and a second end fluidly communicating with said hot fluid inlet; n cold fuel feed conduits each one of which has first and second ends, each of said cold fuel feed conduit first ends fluidly communicating with said fuel source, each one of said cold fuel feed conduit second ends fluidly communicating with a respective one of said cold fuel inlets; n cold fuel flow control devices each one of which is disposed in a respective one of said n cold fuel feed conduits, flows of fuel through said n cold fuel feed conduits being separately and independently controllable by said corresponding cold fuel flow control devices; and n hot fuel feed conduits each one of which has first and second ends, each one of said hot fuel feed conduit first ends fluidly communicating with a respective one of said hot fuel outlets, each one of said hot fuel feed conduit second ends fluidly communicating with a respective one of said burners.

There is also provided a method recovering heat from a furnace, comprising the following steps. A heat transfer fluid is heated at a regenerator or recuperator through heat exchange with hot combustion gases to produce a hot heat transfer fluid. N flows of cold fuel are flowed from an fuel source to a heat exchanger, said heat exchanger comprising a housing, a plurality of fuel tubes comprising n sets of fuel tubes, each set extending through an interior of the housing and fluidly communicating between a respective one of said cold fuel inlets formed in the housing and a respective one of said hot fuel outlets formed in the housing, a hot heat exchange fluid inlet fluidly communicating with an interior of the housing, and a hot fluid outlet fluidly communicating with the housing interior, each of said n flows of cold fuels being directed into a respective one of said sets of fuel tubes, n being an integer equal to or greater than 2. The hot heat transfer fluid is flowed to said hot heat exchange fluid inlet. Heat is exchanged between the hot heat transfer fluid and said flows of cold fuel at said heat exchanger to produce n flows of hot fuel at said hot fuel outlets and a flow of cooled heat transfer fluid. Said flows of hot fuel are flowed from said hot fuel outlets to n burners, each burner comprising an oxidant nozzle and a fuel nozzle. Oxidant and said hot fuel are combusted at said burners to produce the hot combustion gases, wherein flow rates of said flows of cold fuel may controlled independent of one another with a respective n fuel flow control devices disposed upstream of said heat exchanger.

There is also provided a system for recovering heat from a furnace, comprising: a source of fuel; a recuperator or regenerator, said recuperator or regenerator adapted and configured to exchange heat between a flow of cool shell-side fluid and a flow of hot combustion gases from a furnace to produce a flow of hot shell-side fluid; a first shell and tube heat exchanger; a first shell and tube heat exchanger; first and second cool fuel feed conduits; a first controller; and first and second hot fuel feed conduits. The first shell and tube heat exchanger comprises: a shell, a hot shell-side fluid inlet and a cool shell-side fluid outlet formed in the shell thereof, first and second fuel inlets receiving first and second main flows of fuel, respectively, first and second sets of one or more fuel tubes each, the first and second sets receiving the first and second main flows of fuel, respectively, from the first and second fuel inlets, each of the fuel tubes extending through an interior of the shell, and first and second fuel outlets receiving the first and second main flows of fuel, respectively, from the first and second sets of fuel tubes, respectively. The first shell and tube heat exchanger is adapted and configured to transfer heat from the flow of hot shell-side fluid to the main flows of fuel flowing through the fuel tubes. The first cool fuel feed conduit fluidly communicates between the source of fuel and the first fuel inlet. The second cool fuel feed conduit fluidly communicates between the source of fuel and the second fuel inlet. The first and second fuel flow control devices are disposed in the first and second cool fuel feed conduits, respectively. The first controller is adapted and configured to control flow rates of fuel from the fuel source and through the first and second cool fuel feed conduits with the first and second fuel flow control devices, respectively. Each of the first and second fuel flows through the cool fuel feed conduits may be controlled by said first controller independently and separately from control of one other. The first and second hot fuel feed conduits receive the first and second main fuel flows, respectively, from the first and second fuel outlets, respectively.

There is also provided a charge heating installation utilizing pre-heated fuel, comprising: the above-recited system for recovering heat from a furnace; first and second burners receiving first and second flows of hot fuel, respectively, from the first and hot fuel feed conduits, respectively; and a melting furnace containing a charge. Each of the burners is operatively associated with the furnace such that the charge is heated through combustion of an oxidant and the hot fuel injected by the burners. The recuperator or regenerator receives a flow of hot combustion gases from the combustion of the oxidant and the hot fuel in the furnace to produce the flow of hot shell-side fluid.

There is also provided another method for recovering heat from a furnace. The method comprises the following steps. Oxidant and a first flow of hot fuel are injected from a first burner. Oxidant and a second flow of hot fuel are injected from a second burner. The injected oxidant and hot fuel are combusted to heat a charge in the furnace and produce hot combustion gases. Heat is exchanged with a recuperator or regenerator between a flow of cool shell-side fluid and a flow of the hot combustion gases to produce a flow of hot shell-side fluid. First and second main flows of fuel are heated through heat exchange at a shell and tube heat exchanger with the hot shell-side fluid to produce the first and second flows of hot fuel. Flow rates of first and second flows of fuel flowing in first and second cool fuel feed conduits upstream of the fuel inlets are independently and separately controlled, wherein the first and second main flows of fuel are obtained from the first and second flows of fuel.

Any one or more of the above disclosed systems, installation, or methods may include one or more of the following aspects:

- the flow of cooled heat transfer fluid is collected at a cold fluid outlet fluidly communicating with an interior of the housing and directed back to said recuperator or regenerator to complete a cycle of heat transfer.
- the heat transfer fluid is air, carbon dioxide, helium, other inert gas, or mixtures thereof.
- heat conducting packing is present inside the housing and is in thermal contact between adjacent fuel tubes.
- the packing is a ceramic material.
- each of said cold fuel flows is split into an interior stream which is directed into said fuel tubes and an exterior streams which is directed outside of said heat exchanger, the exterior streams being recombined with the corresponding interior streams to provide said hot fuel flows, the degree to which each cold fuel flow is split between the respective interior stream and the respective exterior stream is controlled independently from other of said cold fuel flows with an associated n hot fuel flow control devices.
- each split of the cold fuel flows is controlled independently of other of said cold fuel flows based upon a temperature sensed in the associated hot fuel feed conduit downstream of said recombination.
- the cooled heat exchange fluid is collected at a cold fluid outlet fluidly communicating with an interior of said housing.
- before said recombination, said exterior streams are heated through heat exchange against said cooled heat exchange fluid at an additional heat exchanger.
- n is four or greater
- the furnace is a glass furnace.
- none of the first and second fuel flows bypass the heat exchanger so that the first and second fuel flows become the first and second main fuel flows, respectively.
- first and second bypass valves are disposed in the first and second cool fuel feed conduits.
- each of the bypass valves is adapted and configured to split an associated one of the fuel flows into first and second portions.
- the first portion split by the first bypass valve being the first main fuel flow and the second portion split by the first bypass valve being a first bypass fuel flow.
- the first portion split by the second bypass valve being the second main fuel flow and the second portion split by the second bypass valve being a second bypass fuel flow.
- the first and second bypass flows flowing through first and second bypass flow conduits disposed entirely outside the shell.
- the first hot oxidant feed conduit receiving the first bypass flow from the first bypass flow conduit at which the first bypass flow is combined with the first main fuel flow.
- the second hot fuel feed conduit receiving the second bypass flow from the second bypass flow conduit at which the second bypass flow is combined with the second main fuel flow.
- each of the splits of the first and second fuel flows into the respective first and second portions is controlled by the controller separately and independently of one another.
- It further comprises a source of gaseous fuel and second shell and tube heat, a first cool fuel feed conduit; a second cool fuel feed conduit; first and second fuel flow control devices disposed in the first and second cool fuel feed conduits; and first and hot fuel feed conduits,
- The second shell and tube heat exchanger comprises:
  - a shell,
  - a hot shell-side fluid inlet and a cool shell-side fluid outlet formed in the shell thereof,
  - first and second fuel inlets receiving first and second main flows of fuel, respectively,
  - first and second sets of one or more fuel tubes each, the first and second sets of fuel tubes receiving the first and second main flows of fuel, respectively, from the first and second fuel inlets, each of the fuel tubes extending through an interior of the shell, and
  - first and second fuel outlets receiving the first and second main flows of fuel, respectively, from the first and second sets of fuel tubes, respectively, the second shell and tube heat exchanger being adapted and configured to transfer heat from the flow of hot shell-side fluid to the main flows of fuel flowing through the fuel tubes.
- The first cool fuel feed conduit fluidly communicates between the source of fuel and the first fuel inlet. The second cool fuel feed conduit fluidly communicates between the source of fuel and the second fuel inlet. The first controller or a second controller is adapted and configured to control flow rates of fuel from the fuel source and through the first and second cool fuel feed conduits with the first and second fuel flow control devices, respectively. Each of the first and second fuel flows through the cool fuel feed conduits may be controlled by said controller independently and separately from control of one other. The first and hot fuel feed conduits receive the first and second main fuel flows, respectively, from the first and second fuel outlets, respectively.
- the shell-side fluid is air, carbon dioxide, helium, nitrogen, other inert gas, or mixtures thereof.
- the cool shell-side fluid is produced through heat exchange between the hot shell-side fluid and the first and second main flows of fuel at the shell and tube heat exchanger.
- Each of the first and second fuel flows is split into first and second portions with first and second bypass valves, respectively. The first portion split by the first bypass valve is the first main fuel flow and the second portion split by the first bypass valve is a first bypass fuel flow. The first portion split by the second bypass valve is the second main fuel flow and the second portion split by the second bypass valve is a second bypass fuel flow. The first and second bypass flows flow through first and second bypass flow conduits disposed entirely outside the shell. The first bypass flow is combined with the first main fuel flow downstream of the shell and tube heat exchanger. The second bypass flow is combined with the second main fuel flow downstream of the shell and tube heat exchanger.

each of the splits of the first and second fuel flows into the respective first and second portions is controlled by the controller separately and independently of one another.

The overall design of the heat exchanger is optimized based upon the total power of the combined burners receiving pre-heated fuel (or both oxidant and fuel). This means that the diameter of the fuel tubes, the number of fuel tubes, the fuel tube pitch (i.e., the tube to tube spacing), and the fuel tube length to diameter ratio are optimized based upon the total combined power of the burners receiving the pre-heated fuel. Once these variables are optimized, the heat exchanger is provided with a single shell. Then, the fuel tubes are divided into sets based upon the number of fuel streams to be pre-heated by the heat exchanger where each set receives a separate fuel stream. This design optimization can be distinguished from a combination of heat exchangers each one of which has been individually optimized based upon the burners it supplies with pre-heated fuel where the combination includes a number of shells equal to the number of heat exchangers combined. A combination of heat exchangers is less efficient than the optimized heat exchanger of the invention.

the heat exchanger is provided with a single shell.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 8 is a process flow diagram of a bypass scheme for controlling the temperature of one of the oxidant streams downstream of the heat exchanger.

FIG. 9 is a process flow diagram for the invention.

DETAILED DESCRIPTION

Figure 1:
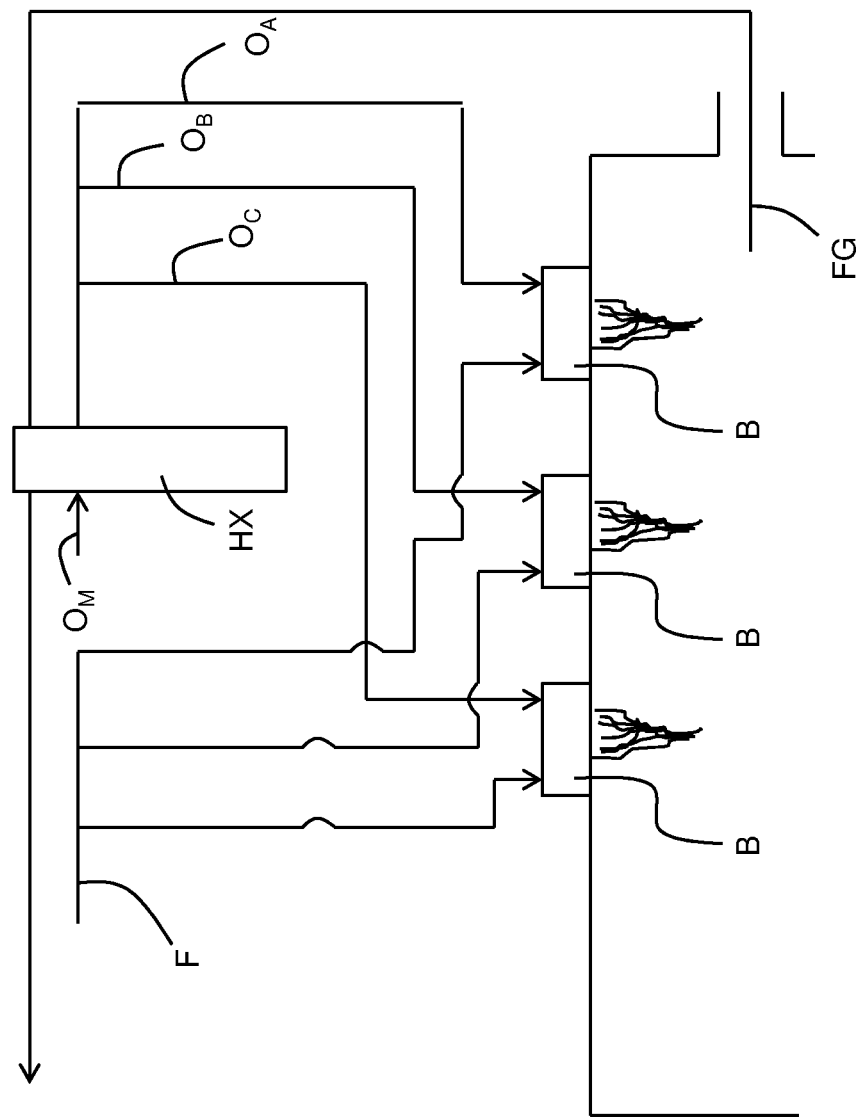
FIG. 1 is a schematic of one prior art heat recovery solution in a furnace.
Figure 2:
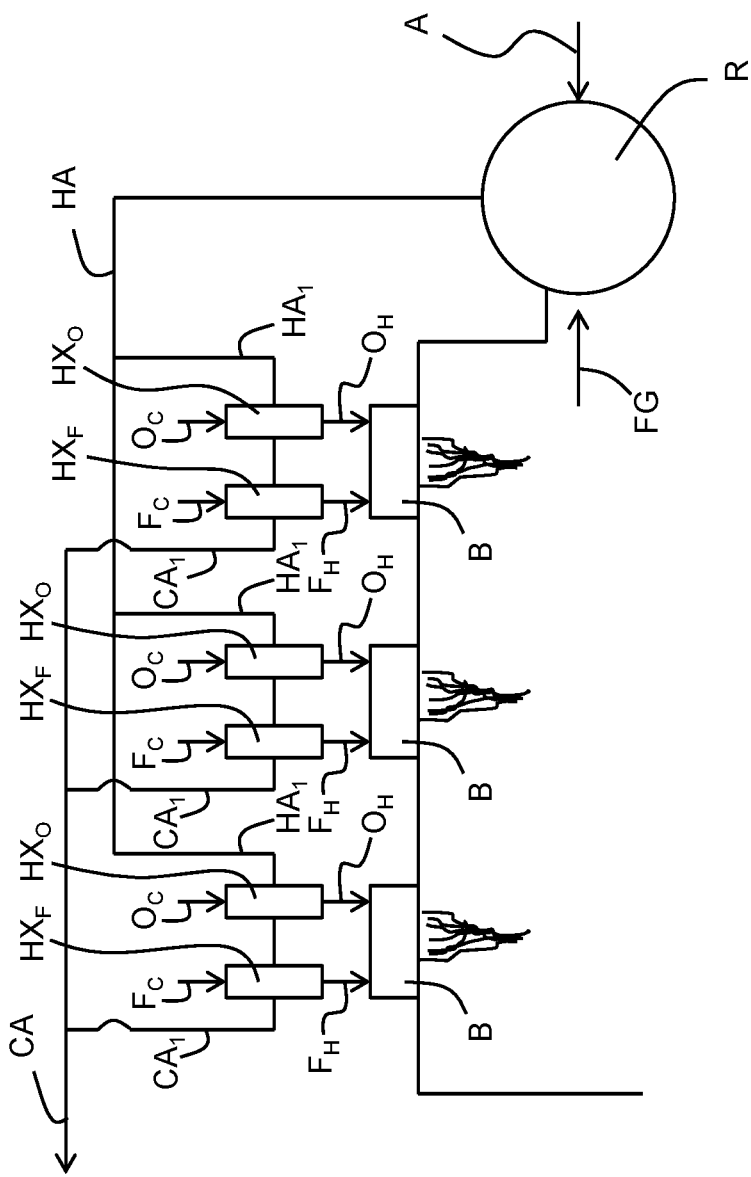
FIG. 2 is a schematic of another prior art heat recovery solution in a furnace.
Figure 3:
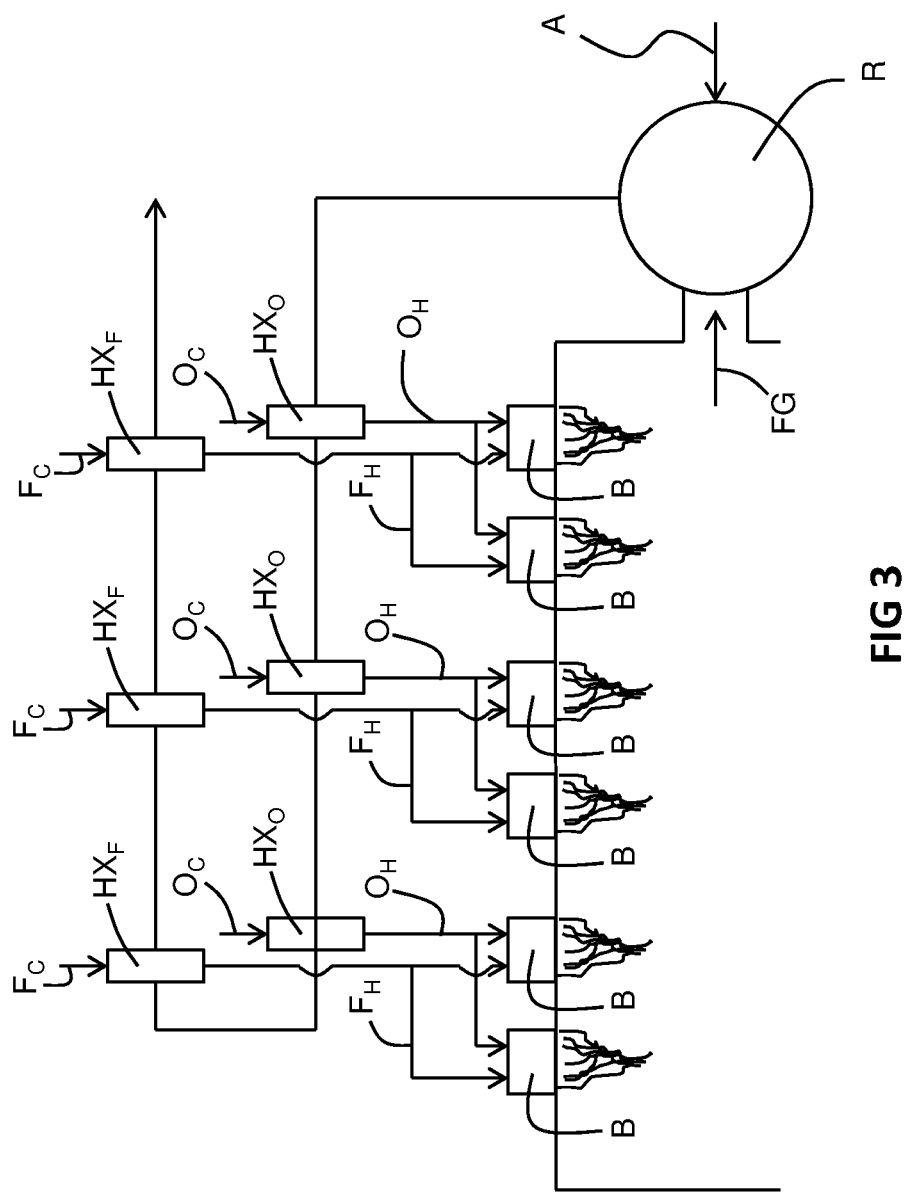
FIG. 3 is a schematic of yet another prior art heat recovery solution in a furnace.

In conventional furnaces, a single source of oxidant and a single source of fuel are typically split up into multiple streams (at ambient temperature) for injection by multiple burners. If an operator wishes to control the power of a particular burner or burners independently of the powers of other burners, it is relatively simple matter of adjusting the flow rate of the fuel and/or oxidant for the burner(s) at issue using a flow control device upstream of or at the burner level.

In the cases of a conventional furnace including burners using pre-heated oxidant and/or pre-heated fuel, each of the reactants (fuel and oxidant) is directed to a heat exchanger as a single stream oxidant at which it is heated through heat exchange with a hot fluid. The heated reactant(s) is then split up into multiple streams in parallel for injection by multiple burners. If an operator wishes to control the power of an individual burner or burners independently of the powers of other burners, the flow rate of the fuel and/or oxidant for the burner(s) at issue hypothetically could be adjusted using a flow control device(s) in the line(s) split off from the pre-heated oxidant stream and/or line(s) split off from the pre-heated fuel stream.

However, this hypothetical approach suffers three significant disadvantages. First, the tolerances in between the internal components of the flow control device are increased due to thermal expansion of those components caused by heat transfer from the hot reactant to those components. The increased tolerances result in the formation of leaks from the device and thus poor control over the flow rate if not creation of a safety risk. Second, any change in the flow rate of a single one of the multiple streams will affect the pressures in the lines conveying the other of the streams because those lines are in parallel and are in flow communication with one another. This effect is exacerbated by the fact that the preheated reactant is at a higher pressure after heating than the ambient temperature reactant. Because the flow rates in the other lines are subject to significant pressure variations and must be simultaneously controlled, this leads to a very complex and difficult control scheme. Third and in the case of hot oxidant in particular, hot oxidative attack of internal components of the flow control device can cause premature or even catastrophic failure due to the enhanced reaction rate of oxidation of the material comprising the device.

The invention overcomes these disadvantages by: a) splitting up the reactant, upstream of heating, into multiple streams, b) using a novel heat exchanger, and c) controlling the flow rates of the reactant streams with flow control devices disposed upstream of the heat exchanger. The flow control devices are not subjected to heating and thus remain relatively leak-proof because the tolerances in between the internal components are not affected. Because the pressure of the reactant source (oxidant or fuel) is at a much higher pressure than those of the multiple reactant streams upstream of the heat exchanger, an adjustment of the flow rate of one of the streams upstream of the heat exchanger does not make as significant an impact in the pressure in the other of the streams. Thus, there is longer a need to simultaneously control the flow rates of the other streams, or alternatively, such simultaneous control is more easily done due to the relatively smaller pressure variations at ambient temperature.

In general, the system and method includes a recuperator or regenerator that is used to transfer heat from hot combustion gases produced in a furnace (containing a charge) to a heat transfer fluid. A shell and tube heat exchanger is used to transfer heat from the hot heat transfer fluid to multiple reactant (oxidant or gaseous fuel) streams. The heat transfer fluid is called the shell-side fluid because it flows through an interior of the heat exchanger on the shell-side, i.e., in the space between the interior surface of the shell and the exterior surfaces of tubes extending in the space. Hence, the oxidant or fuel is called the tube-side fluid because it flows on the tube-side (i.e., through tubes extending through the heat exchanger. As best shown in FIG. 9, control devices $D_A$, $D_B$, $D_C$, $D_D$ equal in number to the number of oxidant and/or fuel streams $M1_A$, $M1_B$, $M1_C$, $M1_D$ are disposed upstream of the heat exchanger HE and are used to control the flow rates of the oxidant and/or fuel streams $M1_A$, $M1_B$, $M1_C$, $M1_D$ flowing to the heat exchanger HE. These flow control devices $D_A$, $D_B$, $D_C$, $D_D$ are controlled with a controller C separately and independently of one another. This means that adjustment of the flow rate of one of the oxidant (or fuel) streams $M1_A$, $M1_B$, $M1_C$, $M1_D$ does not require concomitant adjustment of the flow rates of the other of the oxidant (or fuel) streams $M1_A$, $M1_B$, $M1_C$, $M1_D$.

The shell and tube heat exchanger HE includes multiple oxidant (or fuel) inlets and outlets equal in number to the number of oxidant (or fuel) streams being pre-heated. Extending in flow communication between an associated inlet and outlet is a set of tubes termed oxidant tubes in the case of oxidant pre-heating or fuel tubes in the case of fuel pre-heating. Each oxidant (or fuel) stream is first received by an oxidant (or fuel) inlet and divided into a plurality of sub-streams that flow through the tubes of the associated set. Typically, the tubes extend between upstream and downstream tube sheets in order to separate the oxidant or fuel from the hot shell-side fluid. The sub-streams of oxidant (or fuel) for a given set of tubes are then recombined into the thus-heated flow of oxidant (or fuel) which flows out of the heat exchanger HE at an associated oxidant (or fuel) outlet. Thus, it is seen that each flow of oxidant (or fuel) to be pre-heated is associated with one of the oxidant (or fuel) inlets, with one of the sets of oxidant (or fuel) tubes, and one of the oxidant (or fuel) outlets. The number of tubes per set is non-limiting and may be selected based upon space, design, and material limitations. Typically, the number of tubes per set ranges from 2-12.

The shell and tube heat exchanger HE may optionally include conventional baffles oriented perpendicular to, and outside of, the oxidant (or fuel) tubes so that the hot shell-side fluid follows a serpentine path that allows heat transfer between the hot shell-side fluid and a first portion of the oxidant (or fuel) tubes, then with second portions of the oxidant (or fuel) tubes adjacent to the first portions, and so on. In this manner, the hot shell-side fluid acts to equalize the temperatures of the oxidant (or fuel) tubes, and therefore equalize the temperatures of the oxidant (or fuel) flowing through the tubes. The shell and tube heat exchanger HE may have a cross-sectional configuration conventionally used in the heat exchanger art, including but not limited to: circular, oval, rectangular, and square.

While the heat exchanger HE may be made of out of a wide variety of materials, typically it is made of a material that is recognized as being suitable for handling hot oxidants (in the case of oxygen pre-heating) or hot gaseous fuels (in the case of fuel pre-heating). Additionally, each set of oxidant (or fuel) tubes may optionally be separated from one another by walls running parallel to the tubes. In this case, the hot shell-side fluid is split into a plurality of sub-streams equal in number to the number of sets where each single sub-stream of hot shell-side fluid is caused to flow alongside only one set of oxidant (or fuel) tubes.

The oxidant has an oxygen concentration higher than that of air. Typically, it is oxygen-enriched air or industrially pure oxygen. In the case of no fuel pre-heating, the fuel may be any fuel conventionally used in burners associated with furnaces for heating a charge, including pulverent, particulate, or crushed solid fuels, liquid fuels, or gaseous fuels. In the case of fuel pre-heating, the fuel is gaseous. Typically, the fuel is natural gas, methane, or propane. The furnace may be any conventional furnace designed for heating and/or melting a charge, such as ceramic, glass, or metal. Typically, it is a melting furnace, such as a glass melting furnace. The shell-side fluid may be air, carbon dioxide, helium, other inert gas, or mixtures thereof.

The burner may be any burner suitable for the combustion of a fuel with an oxidant in a furnace for heating and/or melting a charge (such as metal or glass), for example, those disclosed by U.S. Pat. No. 6,910,879, US 2007-0172781, and US 2007-0281254.

In operation, the ratio of the flow rate of shell-side fluid to the flow rate of the oxidant stream or fuel stream is dependent in a trivial way upon a variety of factors, including the type of shell-side fluid, the type of oxidant, the temperature of the shell-side fluid, the temperature of the oxidant before pre-heated, the temperature of the fuel before pre-heating, the desired hot oxidant and hot fuel temperatures, process requirements, and the particular configuration of the heat exchanger. Typically, the ratio is at least 2:1.

The temperature of the shell-side fluid and the hot combustion gases are also dependent in a trivial way upon a variety of factors, including the type of shell-side fluid, the type of combustion gases, the temperature of the shell-side fluid before heat exchange at the recuperator or regenerator, the temperature of the hot combustion gases, process requirements, and the particular configuration of the recuperator or regenerator. While higher temperatures are possible, typically the hot shell-side fluid is at a temperature up to about 730° C. Typically, the oxidant and fuel before pre-heating are at ambient temperature. After pre-heating, the oxidant is typically at a temperature of up to about 700° C., but higher temperatures are still possible. After pre-heating, the fuel is typically at a temperature of up to about 450° C. After heat exchange between the hot shell-side fluid and the oxidant and fuel streams, the cooled shell-side fluid is typically at a temperature of about 200-300° C.

Optionally, each of the oxidant streams is pre-heated at a first heat exchanger while each of the fuel streams is pre-heated at a second heat exchanger. The flow of hot shell-side fluid may be arranged in parallel whereby two streams of the hot shell-side fluid are directed to the two heat exchangers. The flow hot shell-side fluid may instead be arranged in series whereby one of the oxidant and fuel streams is pre-heated at the first heat exchanger through heat exchange with the hot shell-side fluid, and the now-somewhat cooled hot shell-side fluid exiting the first heat exchanger is used to pre-heat the other of the oxidant and fuel streams at the second heat exchanger.

Optionally, the shell-side fluid may be recirculated. By recirculated, we meant that after heat exchange is performed between the shell-side fluid and the oxidant and/or fuel streams, it is returned to the regenerator or recuperator to complete a circuit. In this case, shell-side fluids other than air become more cost-effective. The shell-side fluid may be chosen so as to optimize heat transfer between conduits, for example, by choosing a fluid of high thermal conductivity such as helium. Alternatively, overall heat transfer may be optimized by choosing a fluid of high heat capacity such as carbon dioxide. Optionally, the shell-side fluid is any other inert gas or mixtures of any of helium, carbon dioxide, and the other inert gas.

The overall design of the heat exchanger HE is optimized based upon the total power of the combined burners receiving pre-heated oxidant (and/or fuel). This means that the diameter of the oxidant (or fuel) tubes, the number of oxidant (or fuel) tubes, the oxidant (or fuel) tube pitch (i.e., the tube to tube spacing), and the oxidant (or fuel) length to diameter ratio are optimized based upon the total combined power of the burners receiving the pre-heated oxidant (or fuel). Once these variables are optimized, the heat exchanger is provided with a single shell. Then, the oxidant (or fuel) tubes are divided into sets based upon the number of oxidant (or fuel) streams to be pre-heated by the heat exchanger where each set receives a separate oxidant (or fuel) stream. This design optimization can be distinguished from a combination of heat exchangers each one of which has been individually optimized based upon the burners it supplies with pre-heated oxidant or fuel where the combination includes a number of shells equal to the number of heat exchangers combined. A combination of heat exchangers is less efficient than the optimized heat exchanger of the invention.

The flow rate of each individual, separately controlled, oxidant (or fuel) stream $M1_A$, $M1_B$, $M1_C$, $M1_D$ is typically varied over time in response to process requirements. If the flow rate of one or less than all of the oxidant (or fuel) streams $M1_A$, $M1_B$, $M1_C$, $M1_D$ is lowered, the slower oxidant (or fuel) stream flow rate causes that slower-rate stream to be heated to a relatively higher temperature than other faster-rate streams. This is because the longer residence time of the oxidant (or fuel) inside the heat exchanger HE allows greater heat transfer between the hot heat transfer fluid to the slower-rate stream. Conversely, a higher oxidant (or fuel) stream flow rate causes that faster-rate stream to be heated to a relatively lower temperature than other slower-rate streams because of the shorter residence time of the faster rate stream.

Because the individual oxidant (or fuel) streams $M1_A$, $M1_B$, $M1_C$, $M1_D$ may have higher or lower flow rates (and therefore the oxidant (or fuel) tubes have correspondingly lower or higher temperatures), the thermal expansion or thermal contraction of each oxidant (or fuel) tube conveying that higher or lower flow rate stream may be greater or lesser than those of the other oxidant (or fuel) streams. In order to avoid the possibility that the differing thermal expansions and/or contractions may place undue stresses on the oxidant (or fuel) tubes and the shell, each set of oxidant (or fuel) tubes may be provided with a separate thermal expansion joint. In this manner, the separate joints may allow the differing expansions and contractions of the different sets of tubes without subjecting the heat exchanger HE to undue stresses.

It is desirable to maintain the oxidant (or fuel) temperatures of the various pre-heated oxidant (or fuel) streams as close as possible. However, and as discussed above, when individual oxidant (or fuel) streams have higher or lower flow rates, their temperatures may be lower or higher than the other lower or higher flow rate streams. There are several ways to compensate for these different temperatures.

Under one approach and where appropriate, thermally conductive packing materials may be used to facilitate heat transfer, for example alumina packing may be used. When using packing materials, it is important to have a sufficiently loose packing so that the pressure drop is minimized, while still achieving good thermal contact with the hot and cold surfaces of the heat exchanger. Also, thermal conduction between the oxidant (or fuel) streams is maximized, for example, by using thermally conductive plates to connect the oxidant (or fuel) tubes to one another another. This heat transfer occurs between streams via the plates. By facilitating heat transfer from tube to tube, differences in temperature between the various oxidant (or fuel) streams may be compensated for.

Under another approach, the oxidant (or fuel) tubes of a given set of oxidant (or fuel) tubes are not disposed alongside one another as described above. Thus, after division of a given oxidant (or fuel) stream into a plurality of sub-streams, the oxidant (or fuel) tubes for the various oxidant (or fuel) streams are interleaved with one another. For example and in the case of three streams of oxidant (or fuel) each one of which is divided amongst three oxidant (or fuel) tubes, a first tube of the first stream extends alongside the first tube of the second stream which in turn extends alongside the first tube of the third stream. A second tube of the first stream extends alongside the second tube of the second stream which in turn extends alongside the second tube of the third stream. Finally, a third tube of the first stream extends alongside the third tube of the second stream which in turn extends alongside the third tube of the third stream. In each case, the corresponding first tubes (of the first, second, and third streams) are closer to one other than they are to the second tubes or third tubes of the set stream.

Under yet another approach and as best illustrated by FIG. 8, one or more flows of oxidant (or fuel) $M1_A$, $M1_B$, $M1_C$, $M1_D$ are split into a main flow $M2_A$, $M2_B$, $M2_C$, $M2_C$ and a bypass flow $M3_A$, $M3_B$, $M3_C$, $M3_C$ with a control valve $V_A$, $V_B$, $V_C$, $V_D$. The main flow $M2_A$, $M2_B$, $M2_C$, $M2_C$ is directed into the heat exchanger HE where it is heated through heat exchange with the hot shell-side fluid. The bypass flow $M3_A$, $M3_B$, $M3_C$, $M3_C$ completely bypasses the heat exchanger HE and is recombined with the now-heated main flow. A controller C controls the ratio of the main $M2_A$, $M2_B$, $M2_C$, $M2_D$ and bypass flow $M3_A$, $M3_B$, $M3_C$, $M3_C$ rates via the control valve $V_A$, $V_B$, $V_C$, $V_D$ to a value within the range of 1:0 to 0:1. Typically, the value is in the range of 9:1 to 7:3. While any known process control scheme may be utilized to control this ratio, generally speaking, when a temperature of the stream (downstream of where the main flow and bypass flows are recombined) exceeds a set maximum temperature, the controller C commands the control valve to increase the bypass flow rate and decrease the main flow rate. When a temperature of the stream (again, downstream of where the main and bypass flows are recombined) goes below a set minimum temperature, the controller C commands the control valve to decrease the bypass flow rate and increase the main flow rate.

The overall flow $M1_A$, $M1_B$, $M1_C$, $M1_D$ of cold oxidant is split between an associated interior stream $M2_A$, $M2_B$, $M2_C$, $M2_C$ and an exterior stream $M3_A$, $M3_B$, $M3_C$, b. The interior stream is directed to the feed end of the heat exchanger, heated in the oxidant tubes in heat exchange with the hot heat transfer fluid, and discharged out the hot oxidant outlet. The exterior stream remains outside the heat exchanger and is recombined with the interior stream to again provide the overall flow M1. A temperature setpoint is predetermined for the recombined flow of hot oxidant. By measuring T2 and adjusting the allocation of the overall flow M1 into interior and exterior stream flows M2, M3, the temperature of the hot oxidant after recombination of the streams may be controlled. In other words, if T2 is higher than the setpoint temperature, M3 is increased and M2 is decreased at a valve accomplishing the split until T2 reaches the setpoint. Preferably, a butterfly valve is used to do this. T1 will increase as M1 decreases and will eventually approach a limit close to the hot heat transfer fluid temperature. Close to this limit, T1 will increase slowly as M1 decreases. On the other hand, T2 will decrease through dilution of the interior stream with the cold, unheated exterior stream (having flow M3). This temperature decrease is more rapid close to the limit. In this way, we can achieve a desirable temperature irrespective of overall flow rates.

Figure 4:
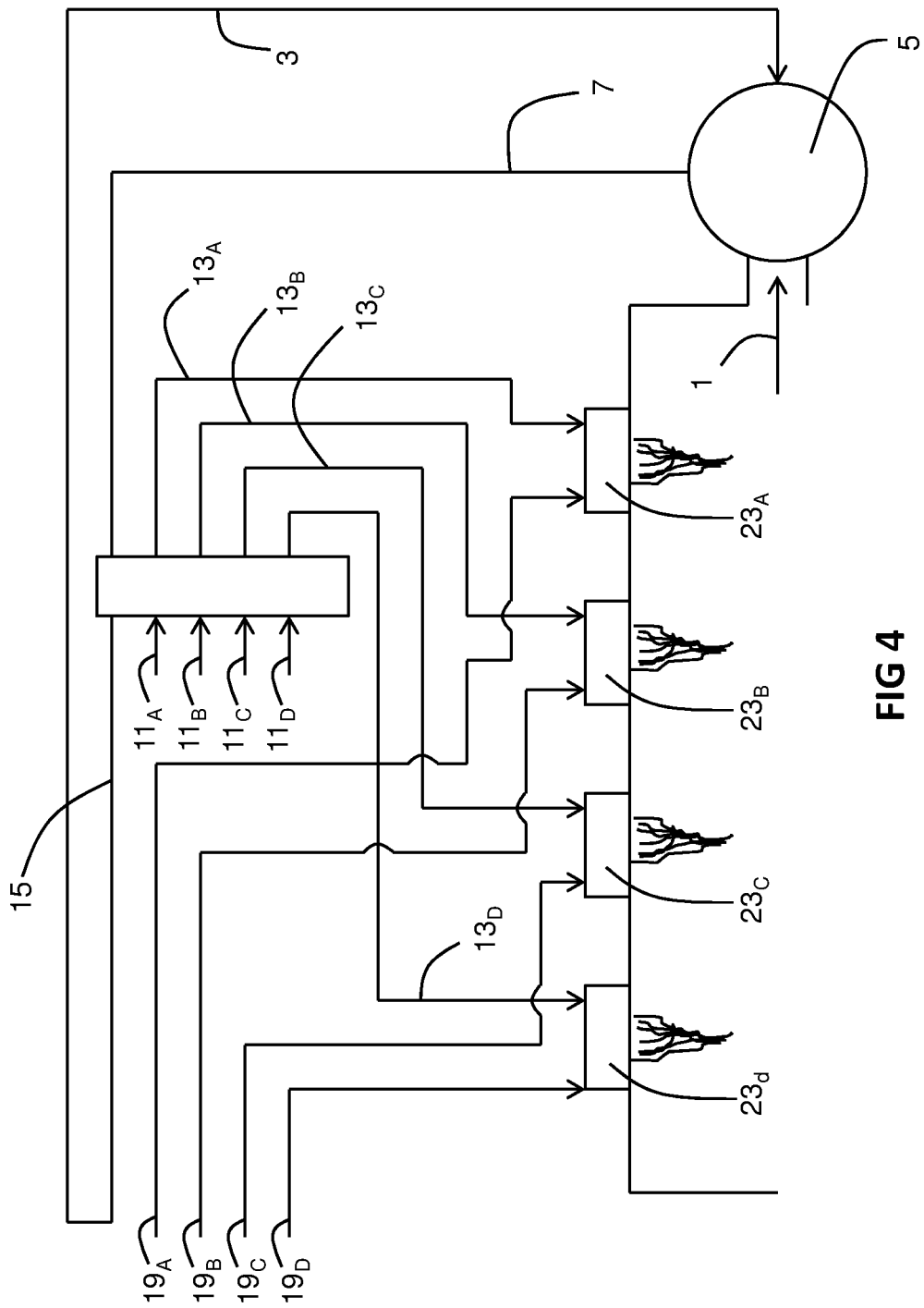
FIG. 4 is a schematic of a non-limiting example of heat recovery in a furnace involving one oxidant heat exchanger and one fuel heat exchanger for every four burners.

One generalized and illustrative arrangement of the invention is shown in FIG. 4. Hot combustion gases 1 preheat a heat transfer fluid (i.e., the shell-side fluid) 3 at a recuperator or regenerator 5. The resultant hot shell-side fluid 7 flows to a heat exchanger 9 for preheating oxidant where it exchanges heat with flows of cold oxidant $11_A$, $11_B$, $11_C$, $11_D$. The resultant flows of hot oxidant $13_A$, $13_B$, $13_C$, $13_C$ are directed to burners $23_A$, $23_B$, $23_C$, $23_C$. The flows of fuel $19_A$, $19_B$, $19_C$, $19_C$ are directed to the burners $23_A$, $23_B$, $23_C$, $23_C$ where the fuel combusts with the hot oxidant to produce the hot combustion gases 1. The hot shell-side fluid is cooled at heat exchanger 9 and is optionally recirculated to the recuperator or regenerator 5 as the shell-side fluid 3 to complete a loop.

Figure 5:
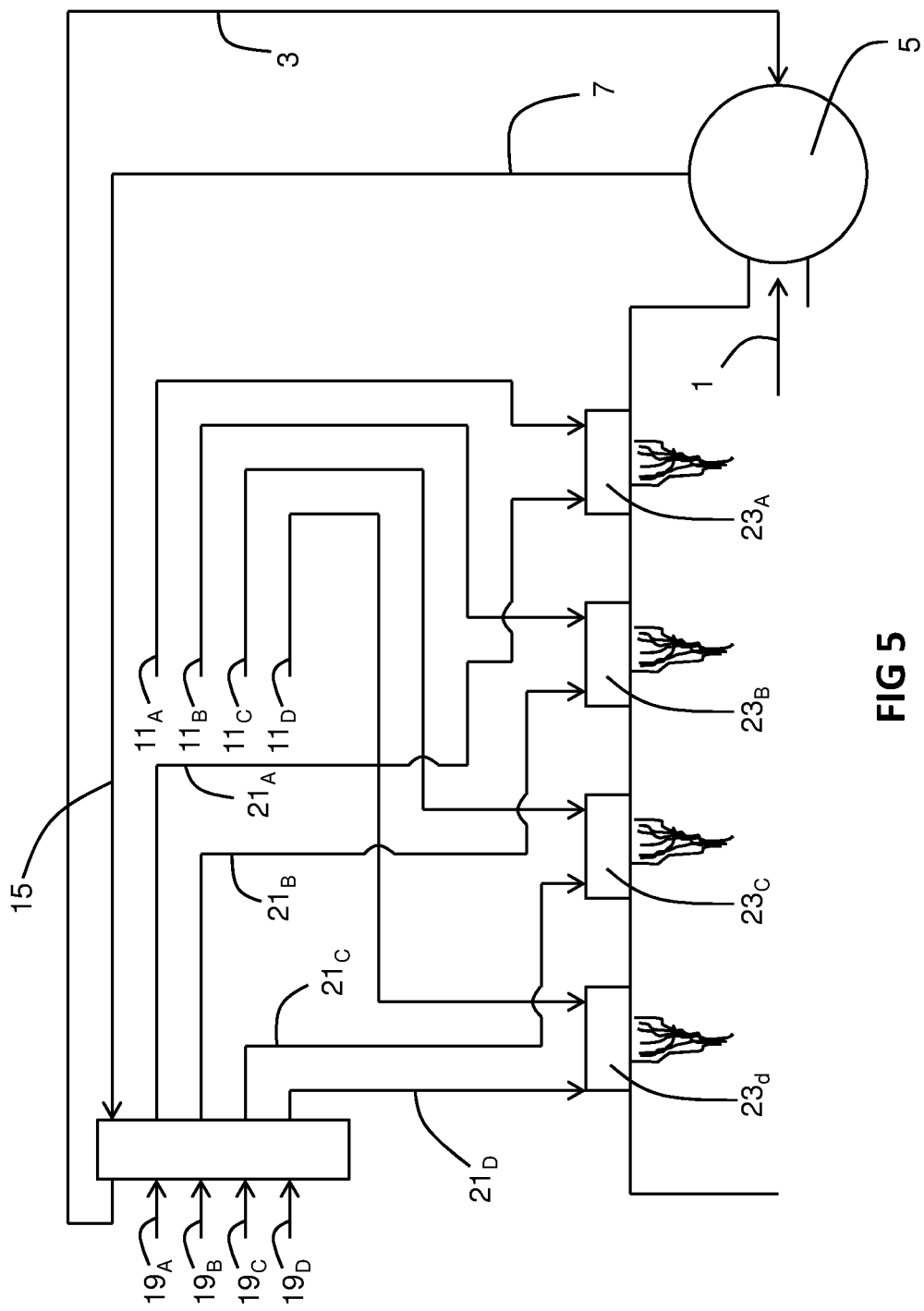
FIG. 5 is a schematic elevation end view (from an oxidant feed end), of one non-limiting example of a shell and tube heat exchanger of the present invention showing interior features.

Another generalized and illustrative arrangement of the invention is shown in FIG. 5. Hot combustion gases 1 preheat the shell-side fluid 3 at a recuperator or regenerator 5. The resultant hot shell-side fluid 7 flows to a heat exchanger 17 for preheating fuel where it exchanges heat with flows of cold fuel $19_A$, $19_B$, $19_C$, $19_D$. The resultant flows of hot fuel $21_A$, $21_B$, $21_C$, $21_D$ are directed to the burners $23_A$, $23_B$, $23_C$, $23_D$ where the hot fuel combusts with the flows of oxidant $11_A$, $11_B$, $11_C$, $11_D$. The hot shell-side fluid is cooled at heat exchanger 17 and is optionally recirculated to the recuperator or regenerator 5 as the shell-side fluid 3 to complete a loop.

Figure 6:
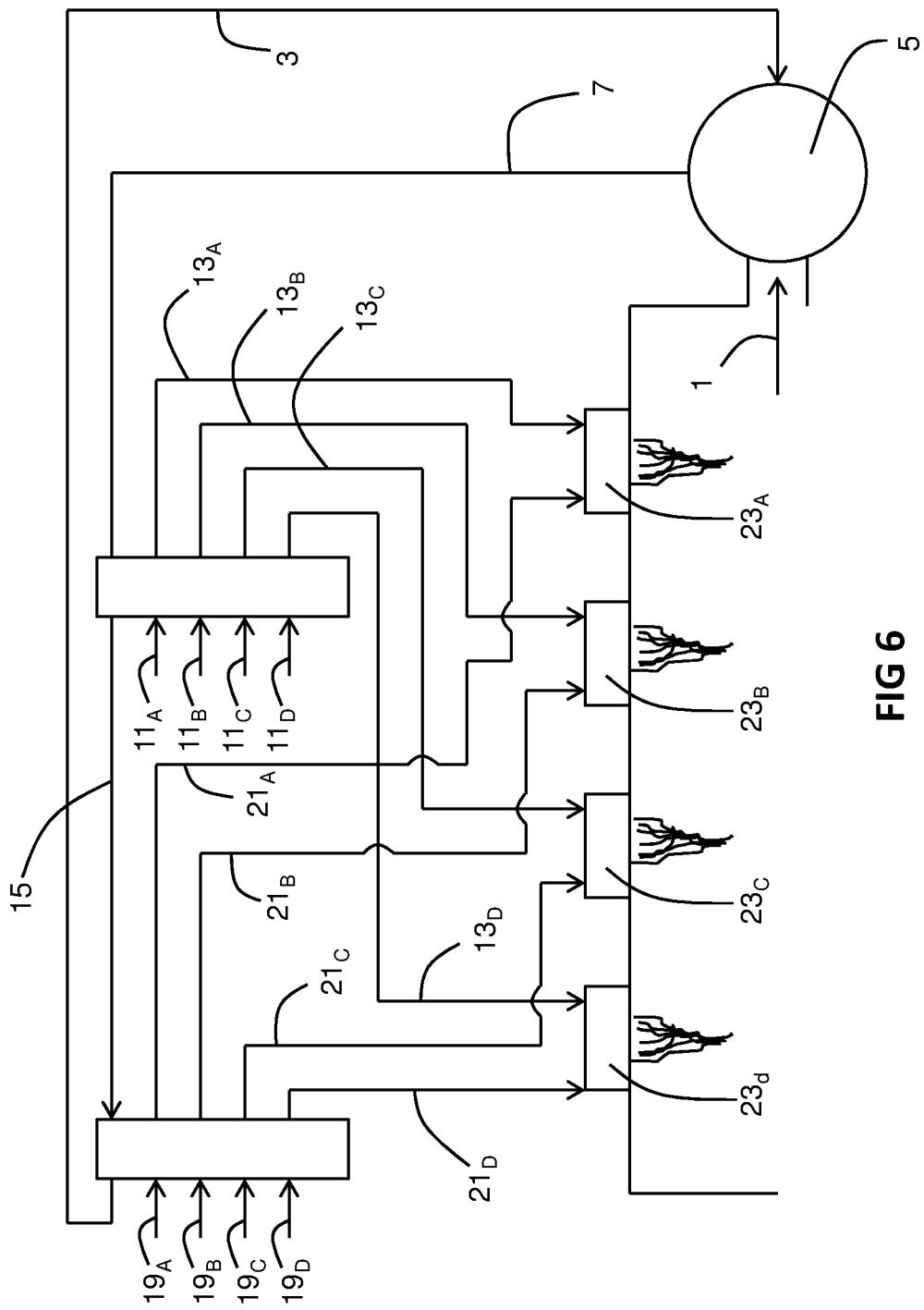
FIG. 6 is a schematic elevation side view of the shell and tube heat exchanger of FIG. 5 showing interior features.

Another generalized and illustrative arrangement of the invention is shown in FIG. 6. Hot combustion gases 1 preheat the shell-side fluid 3 at a recuperator or regenerator 5. The resultant hot shell-side fluid 7 flows to a heat exchanger 9 for preheating oxidant where it exchanges heat with flows of cold oxidant $11_A$, $11_B$, $11_C$, $11_D$. The resultant flows of hot oxidant $13_A$, $13_B$, $13_C$, $13_D$ are directed to burners $23_A$, $23_B$, $23_C$, $23_D$. The hot shell-side fluid is cooled at heat exchanger 9 and is directed to a heat exchanger 17 for preheating fuel where it exchanges heat with flows of cold fuel $19_A$, $19_B$, $19_C$, $19_D$. The resultant flows of hot fuel $21_A$, $21_B$, $21_C$, $21_D$ are directed to the burners $23_A$, $23_B$, $23_C$, $23_D$ where the hot fuel combusts with the hot oxidant to produce the hot combustion gases 1. Optionally, the shell-side fluid 3 (before heating at the recuperator or regenerator 5) may be the cooled shell-side fluid after heat exchanger at the heat exchanger 17.

While FIGS. 4-6 illustrate one heat exchanger for every four streams of oxidant $11_A$, $11_B$, $11_C$, $11_D$ and one heat exchanger for every four streams of fuel $19_A$, $19_B$, $19_C$, $19_D$, the invention is not limited in such a manner. Rather, each heat exchanger may handle as few as two or three oxidant streams $11_A$, $11_B$, $11_C$, $11_D$ or fuel streams $19_A$, $19_B$, $19_C$, $19_D$ or it may handle more than four. Also, while FIGS. 4-6 illustrate only four burners, there may be as few as two or three or as many as several dozen. In the case of a glass melting furnace, typically all of the burners (utilizing preheated oxidant and/or fuel) on one side of a furnace receive pre-heated oxidant and pre-heated fuel from a pair of heat exchangers (one of oxidant and one for fuel) while all of the burners on the opposite side receive pre-heated oxidant and pre-heated fuel from a different pair of heat exchangers (again, one for oxidant and one for fuel). Also, while FIG. 6 illustrates pre-heating of the oxidant before the shell-side fluid 3 is used to pre-heat the fuel, this order may be reversed.

A non-limiting example of a shell and tube exchanger for use in the invention is best shown in FIG. 7A-F, the flows of cold oxidant 11A, 11B, 11C, 11D are received in respective oxidant channels/nozzles $33_A$, $33_B$, $33_C$, $33_D$ formed in shell 36. The hot flows of oxidant $13_A$, $13_B$, $13_C$, $13_D$ exit the heat exchanger from respective oxidant channels/nozzles $51_A$, $51_B$, $51_C$, $51_D$ also formed in shell 36. The flow of hot shell-side fluid 7 is directed into an interior of the shell 36 via hot fluid inlet 35. The cooled shell-side fluid exits the heat exchanger from cold fluid outlet 37.

The interior spaces $41_A$, $41_B$, $41_C$, $41_D$ of the housing adjacent the oxidant (or fuel) channels/nozzles $33_A$, $33_B$, $33_C$, $33_D$ are divided by dividers 39 to keep the flows of oxidant (or fuel) $13_A$, $13_B$, $13_C$, $13_D$ ($21_A$, $21_B$, $21_C$, $21_D$) separate from one another. The interior spaces $49_A$, $49_B$, $49_C$, $49_D$ adjacent the oxidant (or fuel) channels/nozzles $51_A$, $51_B$, $51_C$, $51_D$ are similarly divided by dividers 59 to keep the flows of hot oxidant (or fuel) $13_A$, $13_B$, $13_C$, $13_D$ ($21_A$, $21_B$, $21_C$, $21_D$) separate from one another.

Each flow of oxidant (or fuel) $13_A$, $13_B$, $13_C$, $13_D$ ($21_A$, $21_B$, $21_C$, $21_D$) is split into a plurality of sub-streams that flow from a corresponding chamber $41_A$, $41_B$, $41_C$, $41_D$ and into a corresponding set of oxidant tubes (or fuel) $45_A$, $45_B$, $45_C$, $45_C$. Each of the sub-streams flowing through a given set of oxidant (or fuel) tubes $45_A$, $45_B$, $45_C$, $45_D$ recombines into a single stream of hot oxidant (or fuel) $13_A$, $13_B$, $13_C$, $13_D$ ($21_A$, $21_B$, $21_C$, $21_D$) in an associated chamber $49_A$, $49_B$, $49_C$, $49_D$. In this manner, the flows of hot oxidant (or fuel) $13_A$, $13_B$, $13_C$, $13_D$ ($21_A$, $21_B$, $21_C$, $21_D$) do not comingle with one another but are kept separate by the dividers 39 and oxidant tubes $45_A$, $45_B$, $45_C$, $45_D$, and dividers 59.

With continuing reference to FIGS. 7A-F, the oxidant (or fuel) and shell-side fluid are prevented from contacting one another by virtue of tubesheets 43, 47 separating the interior portion of the heat exchanger through which the hot shell-side fluid flows and through which the oxidant tubes $45_A$, $45_B$, $45_C$, $45_D$ extend from end portions constituting interior spaces $41_A$, $41_B$, $41_C$, $41_D$, $49_A$, $49_B$, $49_C$, $49_D$. In other words, the feed ends and discharge ends of the oxidant (or fuel) tubes $45_A$, $45_B$, $45_C$, $45_D$ are sealed from the hot shell-side fluid by the presence of tube sheets 43, 47.

Figure 7A:
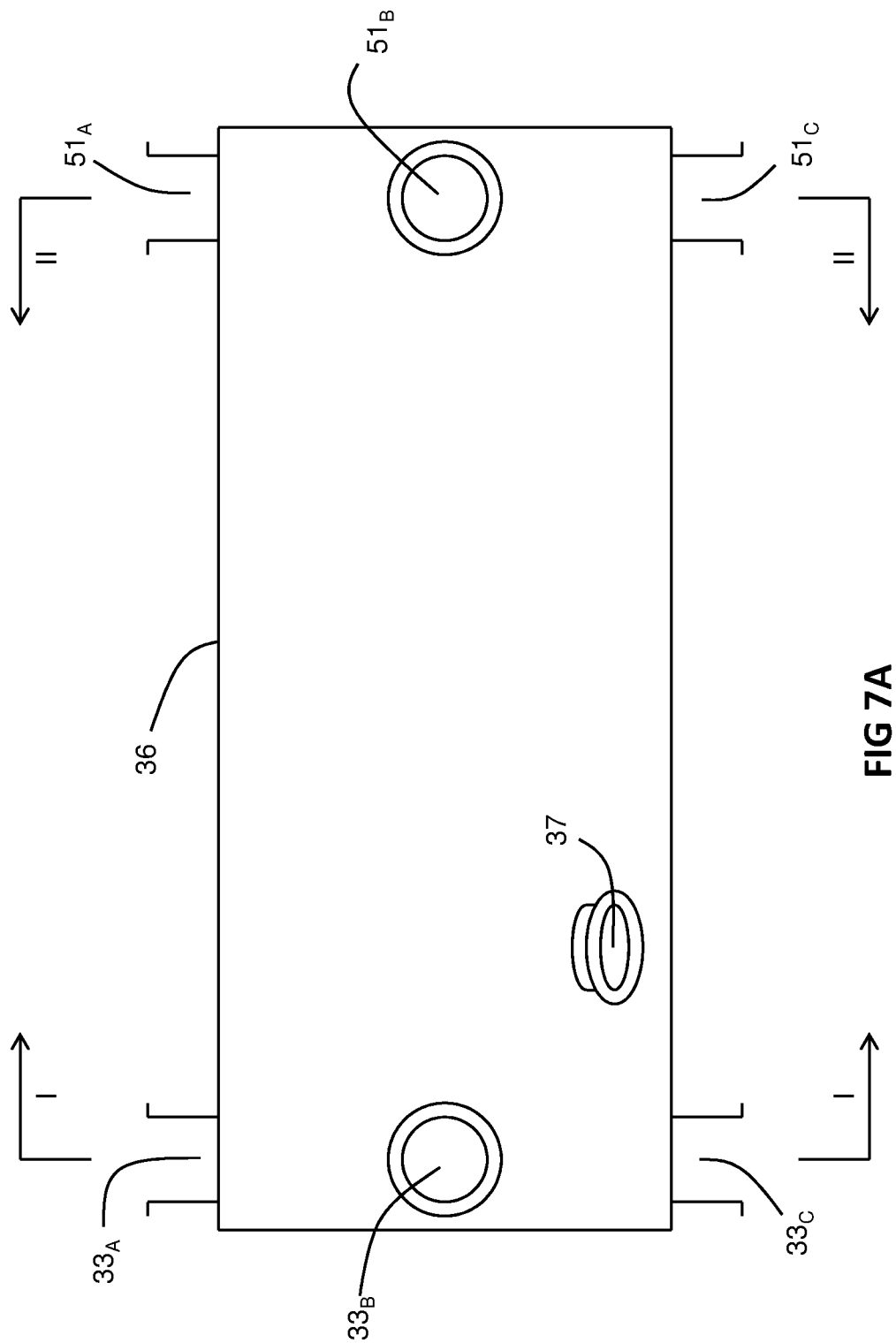
FIG. 7 is a schematic elevation side view of a shell and tube heat exchanger similar to that of FIG. 5 that shows alternative interior features.
Figure 7B:
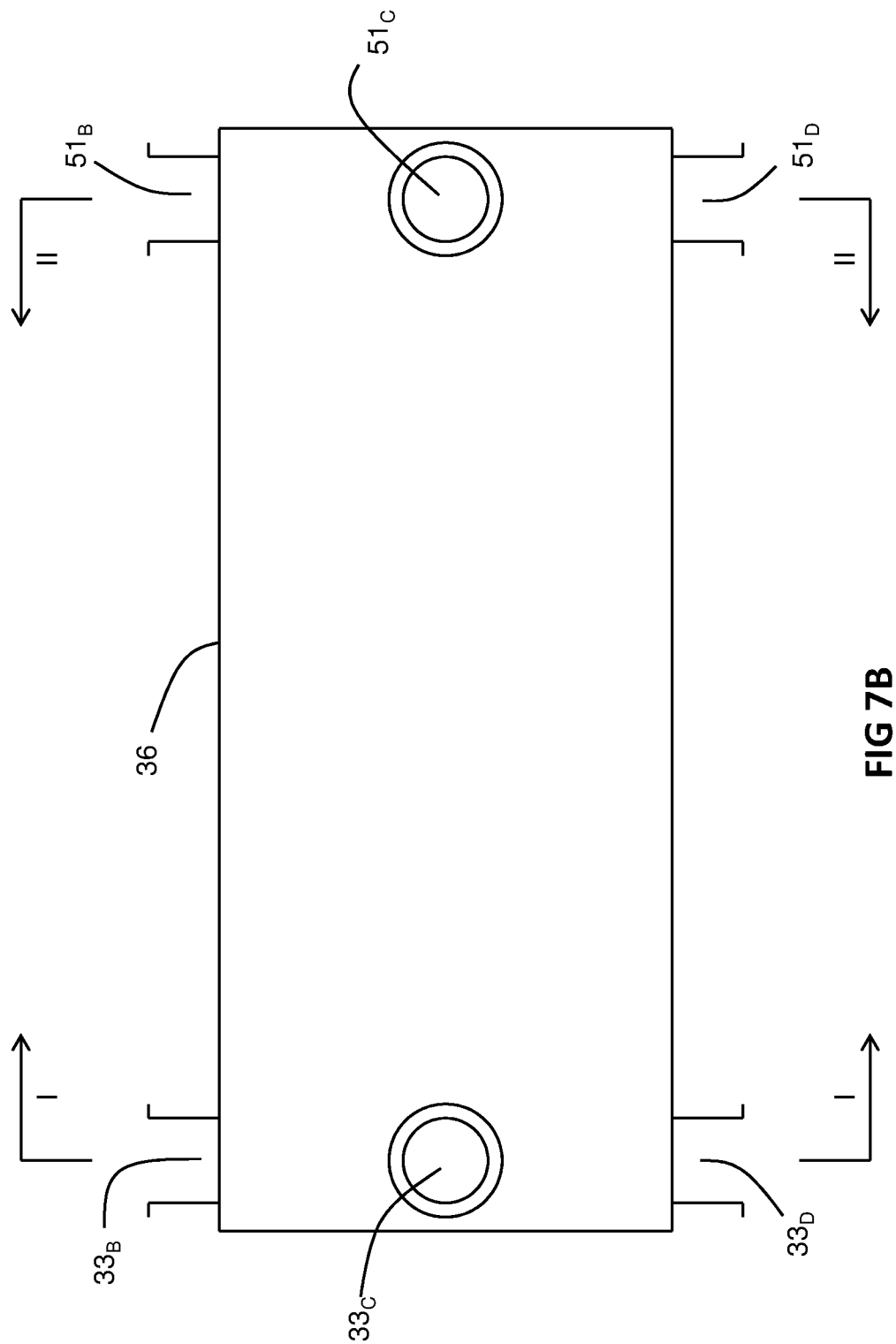
Figure 7D:
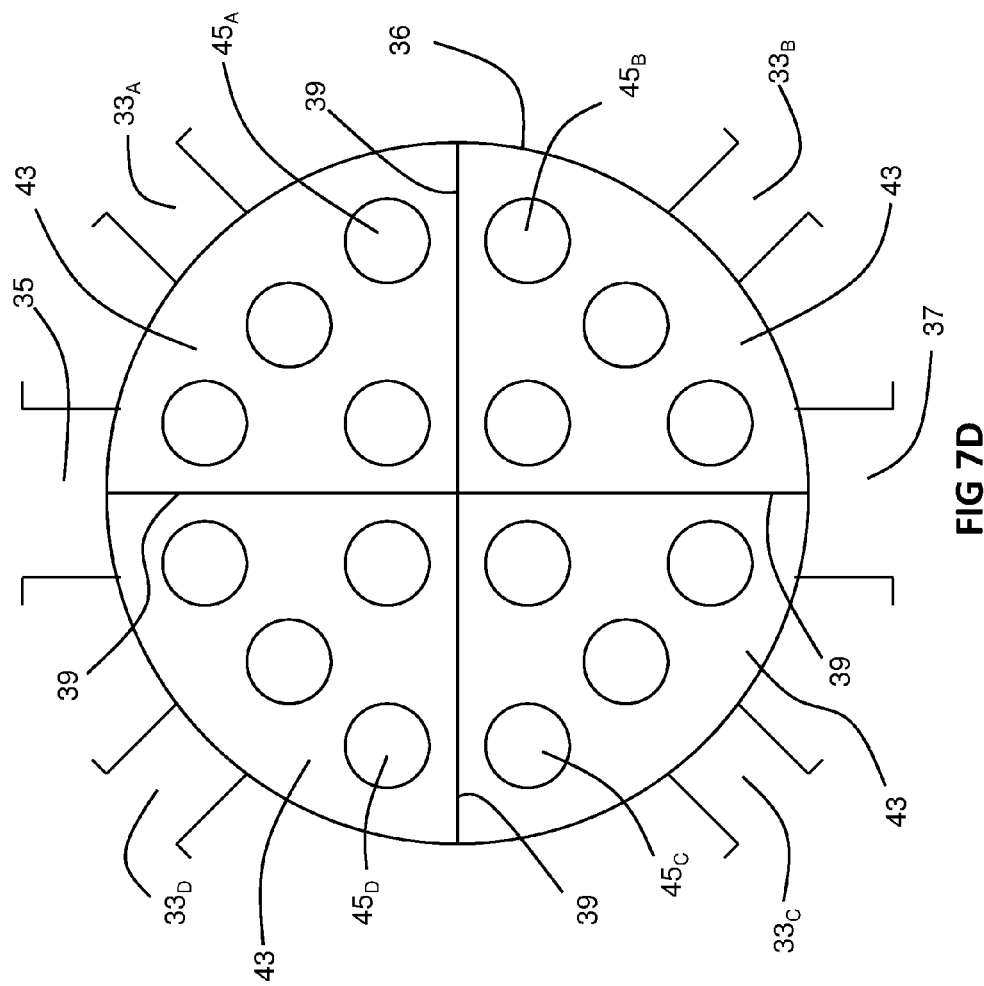
Figure 7E:
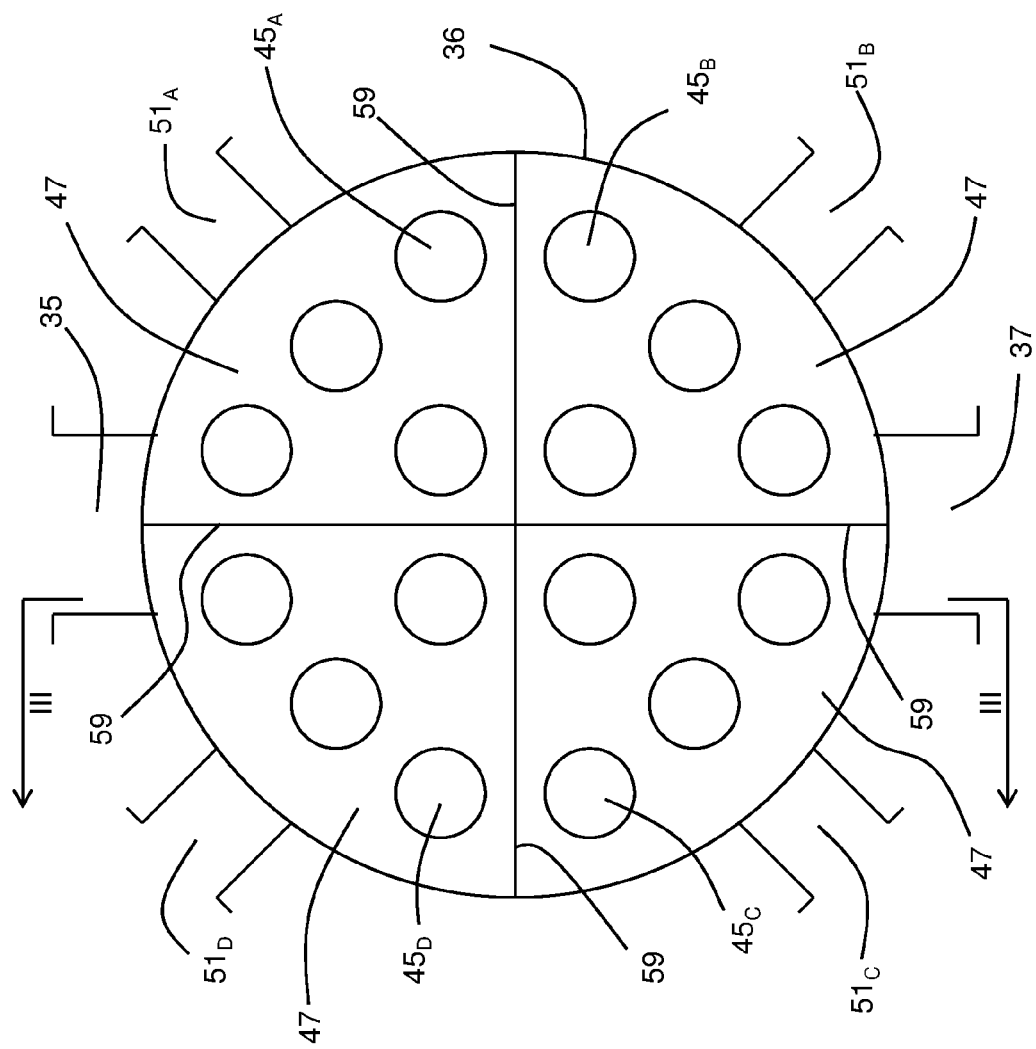
Figure 7F:
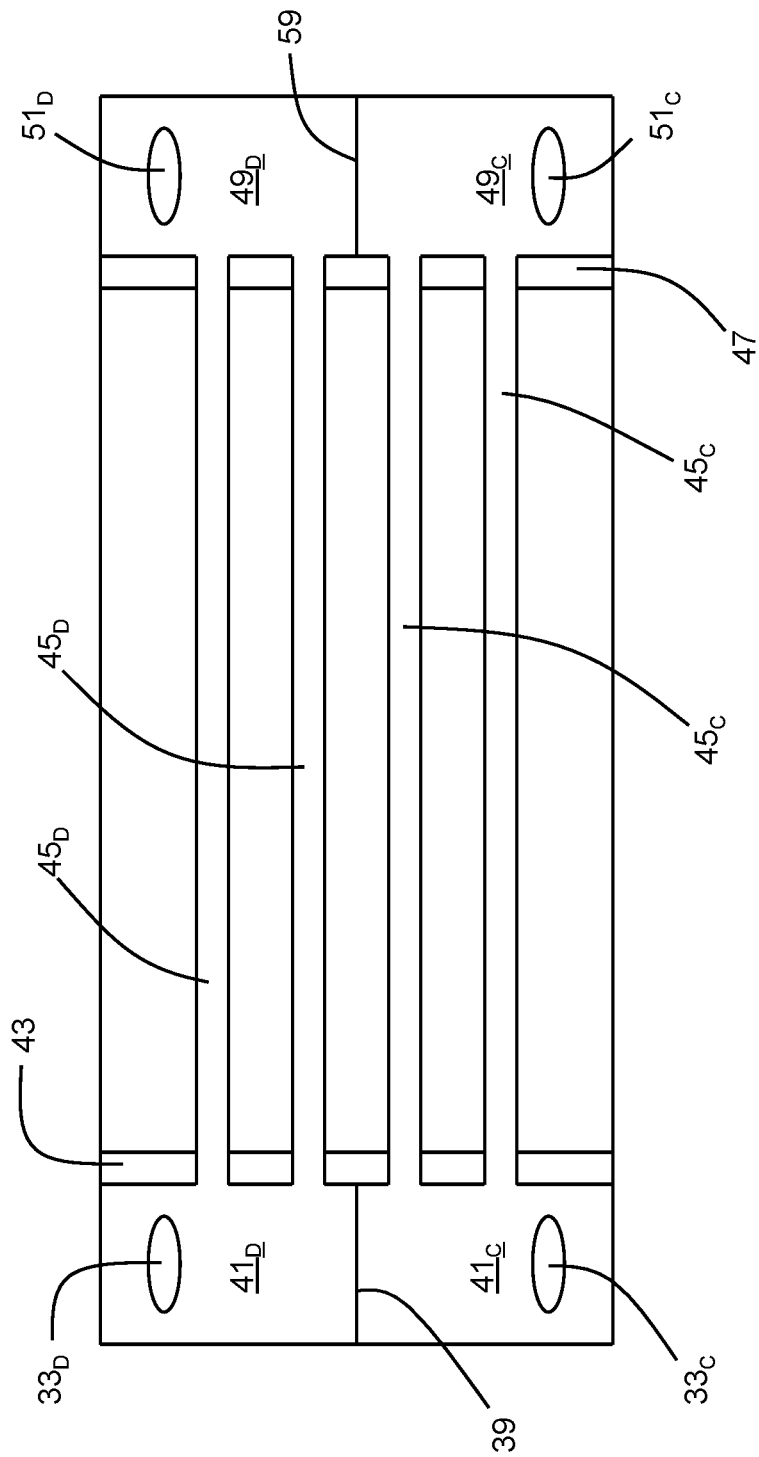
Figure 7G:
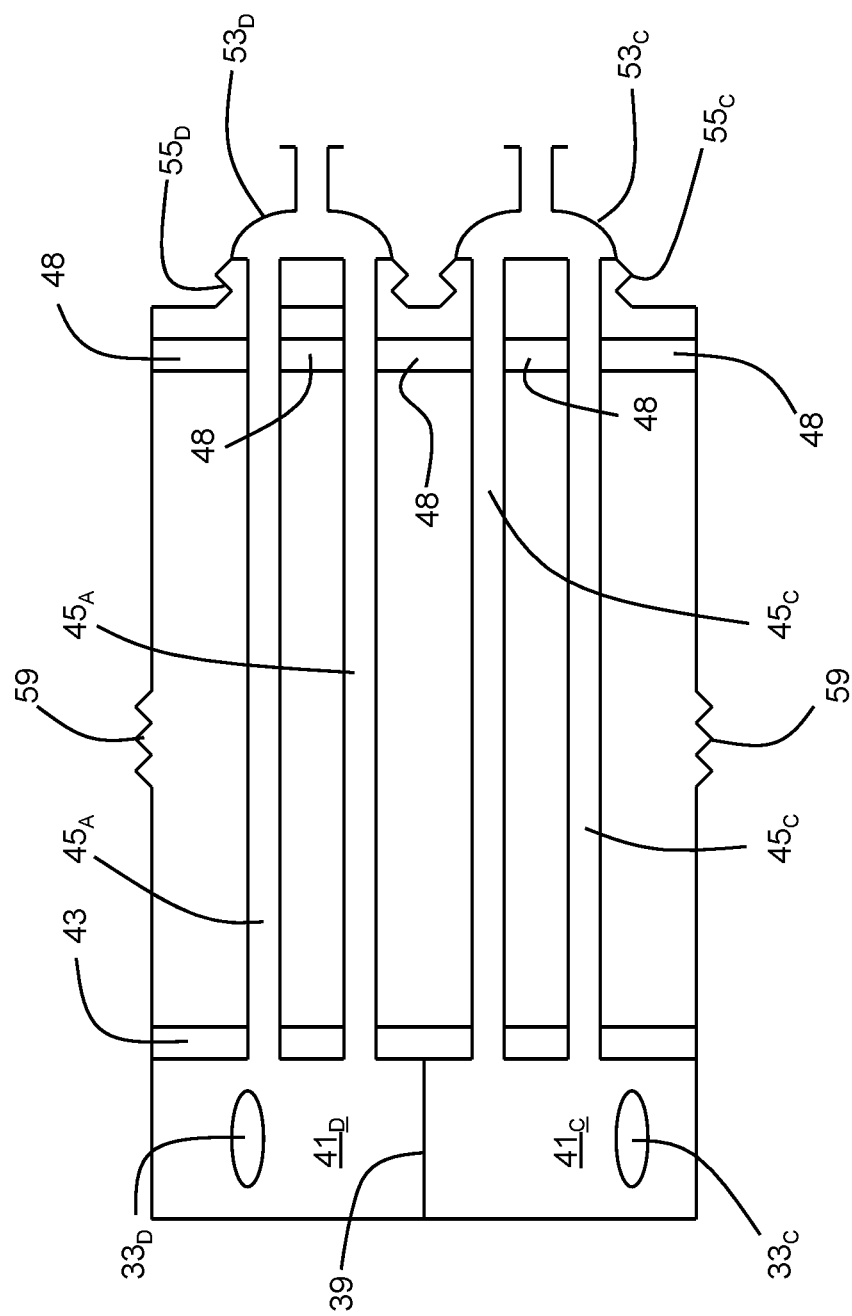

A variant of the shell and tube exchanger of FIGS. 7A-7F is best illustrated in FIG. 7G where features are included that compensate for differences in thermal expansion between the shell and the various sets of oxidant (or fuel) tubes. When one or more of the oxidant flows, for example oxidant flow $11_A$, is decreased through the heat exchanger while the other oxidant flows, for example oxidant flows $11_B$, $11_D$, $11_D$, is kept unadjusted or increased, one of ordinary skill in the art will recognize that the lower flow of oxidant $11_A$ (through associated oxidant tubes $45_A$), will be heated to a relatively higher temperature than the higher flow of oxidant $11_B$, $11_C$, $11_D$ (and associated oxidant tubes $45_B$, $45_C$, $45_D$). The higher temperature oxidant tubes $45_A$ will experience thermal expansion greater than that of the lower temperature oxidant tubes $45_B$, $45_C$, $45_D$. One of ordinary skill in the art will also recognize that the converse situation applies with equal force, namely: the flow rate of oxidant flow $11_A$ is higher while that of oxidant flows $11_B$, $11_C$, $11_D$ are lower and oxidant tube $45_A$ experiences less thermal expansion than that of oxidant tubes $45_B$, $45_C$, $45_D$). If the differences in thermal expansion (and/or contraction) exceed the degree to which the heat exchanger can withstand the resultant stresses, the seal between the oxidant tubes and tube sheets may burst or leak.

To compensate for the above differences in thermal expansion, the shell 36 may be provided with an expansion joint 59. Also, each of the oxidant (or fuel) tubes $45_A$, $45_B$, $45_C$, $45_D$ in a set associated with flow of oxidant (or fuel)

$11_A$, $11_B$, $11_C$ ($19_D$, $19_A$, $19_B$, $19_C$, $19_D$) discharges into an associated collection space that is enclosed and sealed with a bonnet $53_A$, $53_B$ (the bonnets associated with the other flows are not illustrated in FIG. 7G). Each of the bonnets $53_A$, $53_B$ (including those for the other flows) is connected to the shell 36 via an associated expansion joint $55_A$, $55_B$ in order to accommodate the differing thermal expansion/contraction.

In the variant of FIG. 7G, the heat exchanger is not provided with the downstream tubesheet 47. Rather, the heat exchanger includes a "tube sheet-like" divider 48 that provides an imperfect seal in between, on one hand, the interior portion of the shell through which the hot shell-side fluid flows, and on the other hand, the space in between the divider 48 and the downstream end of the shell 36. The divider 48 includes orifices having a cross-section approximating those of the oxidant (or fuel) tubes $45_A$, $45_B$, $45_C$, $45_D$ only with wider dimensions so that the oxidant (or fuel) tubes $45_A$, $45_B$, $45_C$, $45_D$ may slide through expansion or contraction through the orifices. Instead of using a tubesheet 47 to separate the hot shell-side fluid from the oxidant (or fuel) in the collection spaces at the discharge end of the heat exchanger, the combination of the oxidant (or fuel) tubes $45_A$, $45_B$, $45_C$, $45_D$ and the divider 48 keeps the oxidant (or fuel) and hot shell-side fluid separate.

One of ordinary skill in the art will recognize that, while FIGS. 7A-7G illustrate each set as including only four oxidant (or fuel) tubes $45_A$, $45_B$, $45_D$, $45_D$ each, each set may include any number that is only limited by the complexity of manufacturing and/or cost of manufacture.

In one variation, each burner may also receive pre-heated oxidant (or fuel) from two heat exchangers. This enables a larger variation in overall oxidant (or fuel) flow to the burner without imposing a high variation in temperature at the burner. For example, for four burners each consuming 200 Nm³/hr of oxygen (or fuel), and two heat exchangers each configured to pre-heat four oxidant (or fuel) flows, each heat exchanger may deliver 100 Nm³/hr of pre-heated oxidant (or fuel) to each burner from each heat exchanger. Then, if it is required to reduce the oxidant (or fuel) flow to one burner to 100 Nm³/hr, one oxidant (or fuel) stream to that burner is shut off, and the flow of hot air to the corresponding heat exchanger is reduced so as to maintain the temperature of the remaining three flows. In this way the flow to one burner can be reduced by a large factor without impacting the temperature of the oxidant (or fuel) flowing to any burner.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A charge heating installation utilizing pre-heated fuel, comprising:
    a system for recovering heat from a furnace comprising:
        a source of gaseous fuel;
        a recuperator or regenerator, said recuperator or regenerator adapted and configured to exchange heat between a flow of cool shell-side fluid and a flow of hot combustion gases from a furnace to produce a flow of hot shell-side fluid;
        a first shell and tube heat exchanger comprising:
            a shell,
            a hot shell-side fluid inlet and a cool shell-side fluid outlet formed in the shell thereof,
            first and second fuel inlets receiving first and second main flows of the fuel, respectively,
            first and second fuel inlet interior spaces receiving said first and second main flows of the fuel, respectively, said first and second fuel inlet interior spaces being disposed within said shell and being divided from one another by a divider,
            first and second sets of one or more fuel tubes each, the first and second sets receiving the first and second main flows of fuel, respectively, from the first and second fuel inlets via said first and second fuel inlet interior spaces, respectively, each of the fuel tubes extending through an interior of the shell, an upstream tubesheet dividing said first and second fuel inlet interior spaces from the interior portion of said shell that each of the fuel tubes extends through,
            first and second fuel outlet interior spaces receiving said first and second main flows of the fuel, respectively, from said first and second sets of one or more fuel tubes each, respectively, said first and second fuel inlet outlet spaces being disposed within said shell and being divided from one another by a divider,
            first and second fuel outlets receiving the first and second main flows of fuel, respectively, from the first and second sets of fuel tubes, respectively, via said first and second fuel outlet interior spaces, respectively, a downstream tubesheet or a downstream imperfectly sealed tubesheet-like divider dividing said first and second fuel outlet interior spaces from the interior portion of the shell that each of the fuel tubes extends through, the first shell and tube heat exchanger being adapted and configured to transfer heat from the flow of hot shell-side fluid to the main flows of fuel flowing through the fuel tubes;

a first cool fuel feed conduit fluidly communicating between the source of fuel and the first fuel inlet;

a second cool fuel feed conduit fluidly communicating between the source of fuel and the second fuel inlet;

first and second fuel flow control devices disposed in the first and second cool fuel feed conduits, respectively;

a first controller adapted and configured to control flow rates of fuel from the fuel source and through the first and second cool fuel feed conduits with the first and second fuel flow control devices, respectively, wherein each of the first and second fuel flows through the cool fuel feed conduits may be controlled by said first controller independently and separately from control of one other; and first and second hot fuel feed conduits receiving the first and second main fuel flows, respectively, from the first and second fuel outlets, respectively;

first and second burners receiving first and second flows of hot fuel, respectively, from the first and second hot fuel feed conduits, respectively; and a melting furnace containing a charge, each of the burners being operatively associated with the furnace such that the charge is heated through combustion of an oxidant and the hot fuel injected by the burners, wherein the recuperator or regenerator receives a flow of hot combustion gases from the combustion of the hot fuel and the oxidant in the furnace to produce the flow of hot shell-side fluid.

2. The charge heating installation of claim 1, wherein none of the first and second fuel flows bypass the heat exchanger so that the first and second fuel flows become the first and second main fuel flows, respectively.

3. The charge heating installation of claim 1, further comprising first and second bypass valves disposed in the first and second cool fuel feed conduits, respectively, wherein:

each of the bypass valves is adapted and configured to split an associated one of the fuel flows into first and second portions;

the first portion split by the first bypass valve being the first main fuel flow and the second portion split by the first bypass valve being a first bypass fuel flow;

the first portion split by the second bypass valve being the second main fuel flow and the second portion split by the second bypass valve being a second bypass fuel flow;

the first and second bypass flows flowing through first and second bypass flow conduits disposed entirely outside the shell;

the first hot fuel feed conduit receiving the first bypass flow from the first bypass flow conduit at which the first bypass flow is combined with the first main fuel flow; and the second hot fuel feed conduit receiving the second bypass flow from the second bypass flow conduit at which the second bypass flow is combined with the second main fuel flow.

4. The charge heating installation of claim 1, wherein each of the splits of the first and second fuel flows into the respective first and second portions is controlled by the controller separately and independently of one another.

5. The installation of claim 1, wherein none of the first and second fuel flows bypass the heat exchanger so that the first and second fuel flows become the first and second main fuel flows, respectively.

6. The installation of claim 1, further comprising first and second bypass valves disposed in the first and second cool fuel feed conduits, respectively, wherein:

each of the bypass valves is adapted and configured to split an associated one of the fuel flows into first and second portions;

the first portion split by the first bypass valve being the first main fuel flow and the second portion split by the first bypass valve being a first bypass fuel flow;

the first portion split by the second bypass valve being the second main fuel flow and the second portion split by the second bypass valve being a second bypass fuel flow;

the first and second bypass flows flowing through first and second bypass flow conduits disposed entirely outside the shell;

the first hot fuel feed conduit receiving the first bypass flow from the first bypass flow conduit at which the first bypass flow is combined with the first main fuel flow; and the second hot fuel feed conduit receiving the second bypass flow from the second bypass flow conduit at which the second bypass flow is combined with the second main fuel flow.

7. The installation of claim 6, wherein each of the splits of the first and second fuel flows into the respective first and second portions is controlled by the controller separately and independently of one another.

8. A method for recovering heat from a melting furnace containing a charge, comprising the steps of:

providing the charge heating installation of claim 1;

injecting oxidant and a first flow of hot fuel from the first burner;

injecting oxidant and a second flow of hot fuel from the second burner;

combusting the injected oxidant and hot fuel to heat a charge in the furnace and produce hot combustion gases;

exchanging heat with the recuperator or regenerator between a flow of cool shell-side fluid and a flow of the hot combustion gases to produce a flow of hot shell-side fluid;

independently and separately controlling flow rates of first and second flows of fuel flowing in first and second cool fuel feed conduits upstream of the first and second fuel inlets;

feeding the independently and separately flow rate-controlled first and second flows of fuel to the first and second fuel inlets, respectively;

receiving, from the first and second fuel inlets, the independently and separately flow rate-controlled first and second flows of fuel into the first and second fuel inlet interior spaces;

receiving, from the first and second fuel inlets via said first and second fuel inlet interior spaces, respectively, the first and second main flows of fuel into the first and second sets of one or more fuel tubes each, respectively;

heating the first and second flows of fuel through heat exchange with the hot shell-side fluid across the first and second sets of one or more fuel tubes each, respectively to produce the first and second flows of hot fuel; and receiving, from said first and second sets of one or more fuel tubes each, respectively, said first and second main flows of the fuel into the first and second fuel outlet interior spaces, respectively.

9. The method of claim 8, wherein the shell-side fluid is air, carbon dioxide, helium, nitrogen, other inert gas, or mixtures thereof.

10. The method of claim 8, further comprising the step of producing the cool shell-side fluid through heat exchange between the hot shell-side fluid and the first and second main flows of fuel at the shell and tube heat exchanger.

11. The method of claim 8, wherein none of the first and second fuel flows bypass the heat exchanger so that the first and second fuel flows become the first and second main fuel flows, respectively.

12. The method of claim 8, further comprising the steps of:

splitting each of the first and second fuel flows into first and second portions with first and second bypass valves, respectively, wherein:

the first portion split by the first bypass valve being the first main fuel flow and the second portion split by the first bypass valve being a first bypass fuel flow, and the first portion split by the second bypass valve being the second main fuel flow and the second portion split by the second bypass valve being a second bypass fuel flow, the first and second bypass flows flowing through first and second bypass flow conduits disposed entirely outside the shell;

combining the first bypass flow with the first main fuel flow downstream of the shell and tube heat exchanger; and combining the second bypass flow with the second main fuel flow downstream of the shell and tube heat exchanger.

13. The method of claim 12, wherein each of the splits of the first and second fuel flows into the respective first and second portions is controlled by the controller separately and independently of one another.

* * * * *